US012444085B2

(12) United States Patent
Nath

(10) Patent No.: US 12,444,085 B2
(45) Date of Patent: Oct. 14, 2025

(54) SYSTEMS AND METHODS FOR AIRCRAFT CORROSION DETECTION

(71) Applicant: THE BOEING COMPANY, Arlington, VA (US)

(72) Inventor: Manoj Nath, Bangalore (IN)

(73) Assignee: The Boeing Company, Arlington, VA (US)

( * ) Notice: Subject to any disclaimer, the term of this patent is extended or adjusted under 35 U.S.C. 154(b) by 406 days.

(21) Appl. No.: 18/154,384

(22) Filed: Jan. 13, 2023

(65) Prior Publication Data

US 2024/0242383 A1 Jul. 18, 2024

(51) Int. Cl.
*G06T 7/90* (2017.01)
*B64D 45/00* (2006.01)
*B64F 5/60* (2017.01)
*G06T 7/00* (2017.01)

(52) U.S. Cl.
CPC .............. *G06T 7/90* (2017.01); *B64D 45/00* (2013.01); *B64F 5/60* (2017.01); *G06T 7/0002* (2013.01); *B64D 2045/0085* (2013.01)

(58) Field of Classification Search
CPC ......... G06T 7/90; G06T 7/0002; B64D 45/00; B64D 2045/0085; B64F 5/60
See application file for complete search history.

(56) References Cited

U.S. PATENT DOCUMENTS

| 10,964,064 | B1* | 3/2021 | Watling | G06F 16/5838 |
| 2019/0172194 | A1* | 6/2019 | Starr | G06T 7/62 |
| 2020/0211175 | A1* | 7/2020 | Kunik | G01N 21/95 |
| 2020/0380653 | A1* | 12/2020 | Tanizawa | G06T 7/571 |

OTHER PUBLICATIONS

"Aircraft Corrosion," AOPA, downloaded Nov. 14, 2022, https://www.aopa.org/go-fly/aircraft-and-ownership/maintenance-and-inspections/aircraft-corrosion, pp. 1-7.
Wikipedia, "Corrosion," downloaded on Nov. 14, 2022, https://en.wikipedia.org/wiki/Corrosion, pp. 1-17.

* cited by examiner

*Primary Examiner* — Casey L Kretzer
(74) *Attorney, Agent, or Firm* — Moore IP Law

(57) ABSTRACT

A device includes a processor configured to obtain an image of at least a portion of an aircraft. The processor is also configured to determine a first color value descriptive of a first color associated with a first set of pixels, and to determine a second color value descriptive of a second color associated with a second set of pixels. The first set of pixels and the second set of pixels are included in a corrosion image section of the image. The processor is also configured to determine that the first color value is associated with a first corrosion level, and to determine that the second color value is associated with a second corrosion level. The processor is further configured to store the first corrosion level in an aircraft corrosion data repository, and to store the second corrosion level in the aircraft corrosion data repository.

20 Claims, 14 Drawing Sheets

SYSTEMS AND METHODS FOR AIRCRAFT CORROSION DETECTION

FIELD OF THE DISCLOSURE

The present disclosure is generally related to aircraft corrosion detection.

BACKGROUND

Corrosion can occur on metal surfaces as a result of chemical reactions between the metal and surrounding environment. Untreated corrosion can impact strength and permeability of the metal over time. Typically, a technician performs a visual inspection of an aircraft to detect distinctive discoloration that indicates corrosion. A visual inspection by a person can be costly and time-consuming with a possibility of human error.

SUMMARY

In a particular implementation, a device includes one or more processors configured to obtain an image of at least a portion of an aircraft. The one or more processors are also configured to determine a first color value descriptive of a first color associated with a first set of pixels that are included in a corrosion image section of the image. The one or more processors are further configured to determine a second color value descriptive of a second color associated with a second set of pixels that are included in the corrosion image section. The one or more processors are also configured to determine that the first color value is associated with a first corrosion level, and to determine that the second color value is associated with a second corrosion level. The one or more processors are further configured to store the first corrosion level in an aircraft corrosion data repository that is associated with the aircraft, and to store the second corrosion level in the aircraft corrosion data repository.

In another particular implementation, a method includes obtaining, at a device, an image of at least a portion of an aircraft. The method also includes determining, at the device, a first color value descriptive of a first color associated with a first set of pixels that are included in a corrosion image section of the image. The method further includes determining, at the device, a second color value descriptive of a second color associated with a second set of pixels that are included in the corrosion image section. The method also includes determining, at the device, that the first color value is associated with a first corrosion level. The method further includes determining, at the device, that the second color value is associated with a second corrosion level. The method also includes storing the first corrosion level in an aircraft corrosion data repository that is associated with the aircraft. The method further includes storing the second corrosion level in the aircraft corrosion data repository.

In another particular implementation, a non-transitory computer-readable medium stores instructions that, when executed by one or more processors, cause the one or more processors to obtain an image of at least a portion of an aircraft. The instructions, when executed by the one or more processors, also cause the one or more processors to determine a first color value descriptive of a first color associated with a first set of pixels that are included in a corrosion image section of the image. The instructions, when executed by the one or more processors, further cause the one or more processors to determine a second color value descriptive of a second color associated with a second set of pixels that are included in the corrosion image section. The instructions, when executed by the one or more processors, also cause the one or more processors to determine that the first color value is associated with a first corrosion level. The instructions, when executed by the one or more processors, further cause the one or more processors to determine that the second color value is associated with a second corrosion level. The instructions, when executed by the one or more processors, also cause the one or more processors to store the first corrosion level in an aircraft corrosion data repository that is associated with the aircraft. The instructions, when executed by the one or more processors, further cause the one or more processors to store the second corrosion level in the aircraft corrosion data repository.

The features, functions, and advantages described herein can be achieved independently in various implementations or may be combined in yet other implementations, further details of which can be found with reference to the following description and drawings.

DETAILED DESCRIPTION

Figure 1:
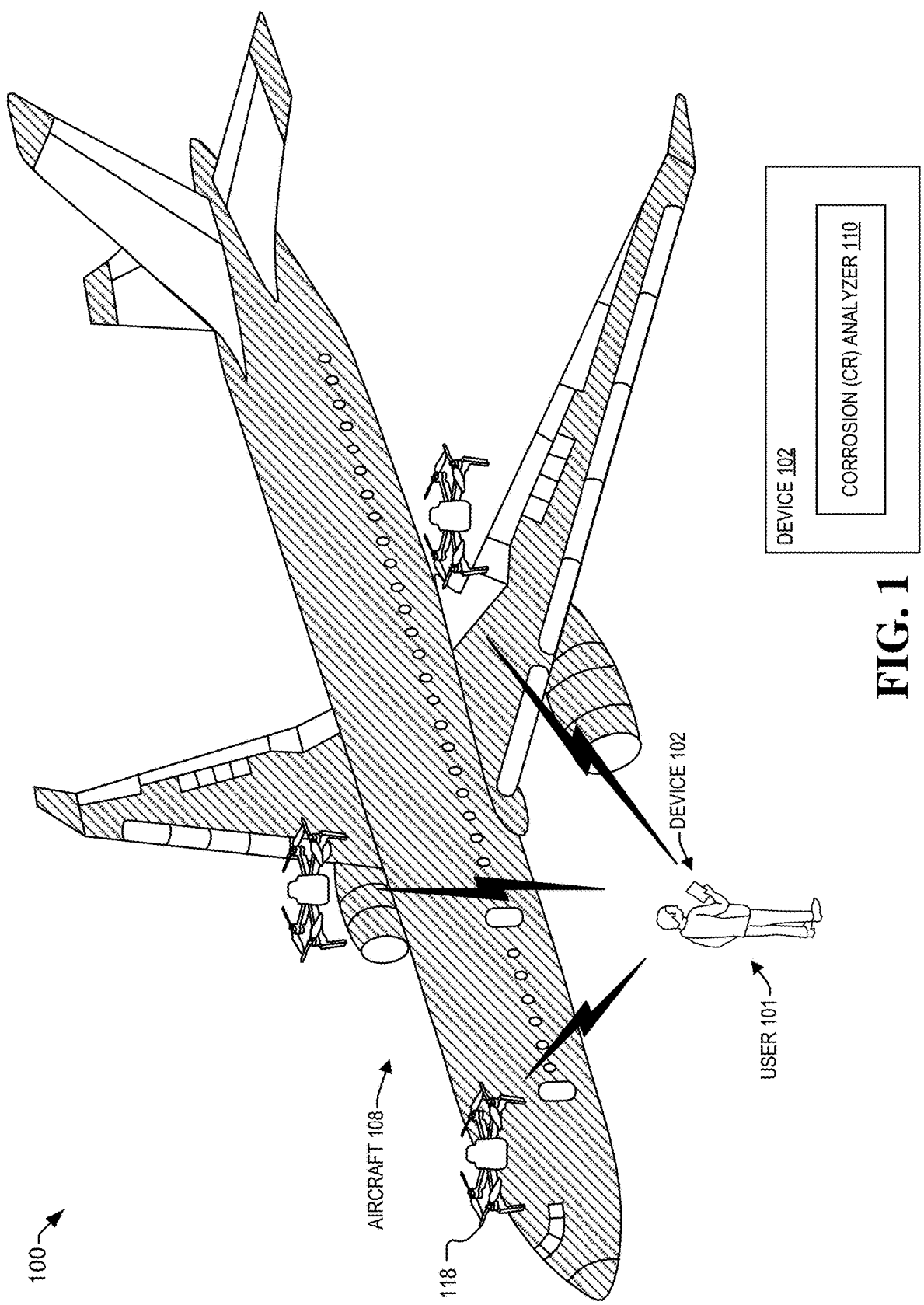
FIG. 1 is a diagram that illustrates a system configured to detect aircraft corrosion.

Aspects disclosed herein present systems and methods for aircraft corrosion detection. Untreated corrosion can impact strength and permeability of metal over time. A visual inspection by a person to detect corrosion can be costly and time-consuming with a possibility of human error.

A corrosion color updater generates a corrosion color repository that indicates a mapping between corrosion colors and corrosion levels. For example, the corrosion color updater receives images of an aircraft and generates a graphical user interface (GUI) indicating color values detected in the images. A user (e.g., a technician) provides a user input indicating that a color value corresponds to a particular corrosion level (e.g., low, medium, or high). The corrosion color updater adds a mapping between the color value and the particular corrosion level in the corrosion color repository.

An aircraft corrosion detector uses the corrosion color repository to detect corrosion. For example, the aircraft corrosion detector receives images of an aircraft. The aircraft corrosion detector determines whether a first color value indicated in an image of the aircraft matches any color value indicated in the corrosion color repository. The aircraft corrosion detector, in response to determining that the first color value matches a second color value indicated in the corrosion color repository that is associated with a particular corrosion level, determines that the particular corrosion level is detected. In some examples, the aircraft corrosion detector determines a location on the aircraft that is associated with the image and generates a GUI indicating that the particular corrosion level is detected at the location. The aircraft corrosion detector can also determine a corrosion change at the location based on a comparison of the particular corrosion level and previous corrosion level indicated by historical corrosion data. The aircraft corrosion detector can take remedial actions based on determining whether the particular corrosion level is greater than a corrosion level remedial threshold, the corrosion change is greater than a corrosion change remedial threshold, or both. For example, the remedial actions can include generating an alert, scheduling maintenance, etc.

Using a corrosion color repository, instead of individual technician decisions, to determine a corrosion level corresponding to a color value can increase accuracy of the corrosion level detection. For example, the corrosion color repository maps a particular color value to a particular corrosion level. Without the corrosion color repository, the particular color value could be mapped to different corrosion levels by different technicians or by the same technician at different times. Higher accuracy of corrosion level detection enables appropriate resource allocation for any remedial measures and enables reliable tracking of corrosion changes.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple image color values are illustrated and associated with reference numbers 254A and 254B. When referring to a particular one of these image color values, such as the image color value 254A, the distinguishing letter "A" is used. However, when referring to any arbitrary one of these image color values or to these image color values as a group, the reference number 254 is used without a distinguishing letter.

Figure 2:
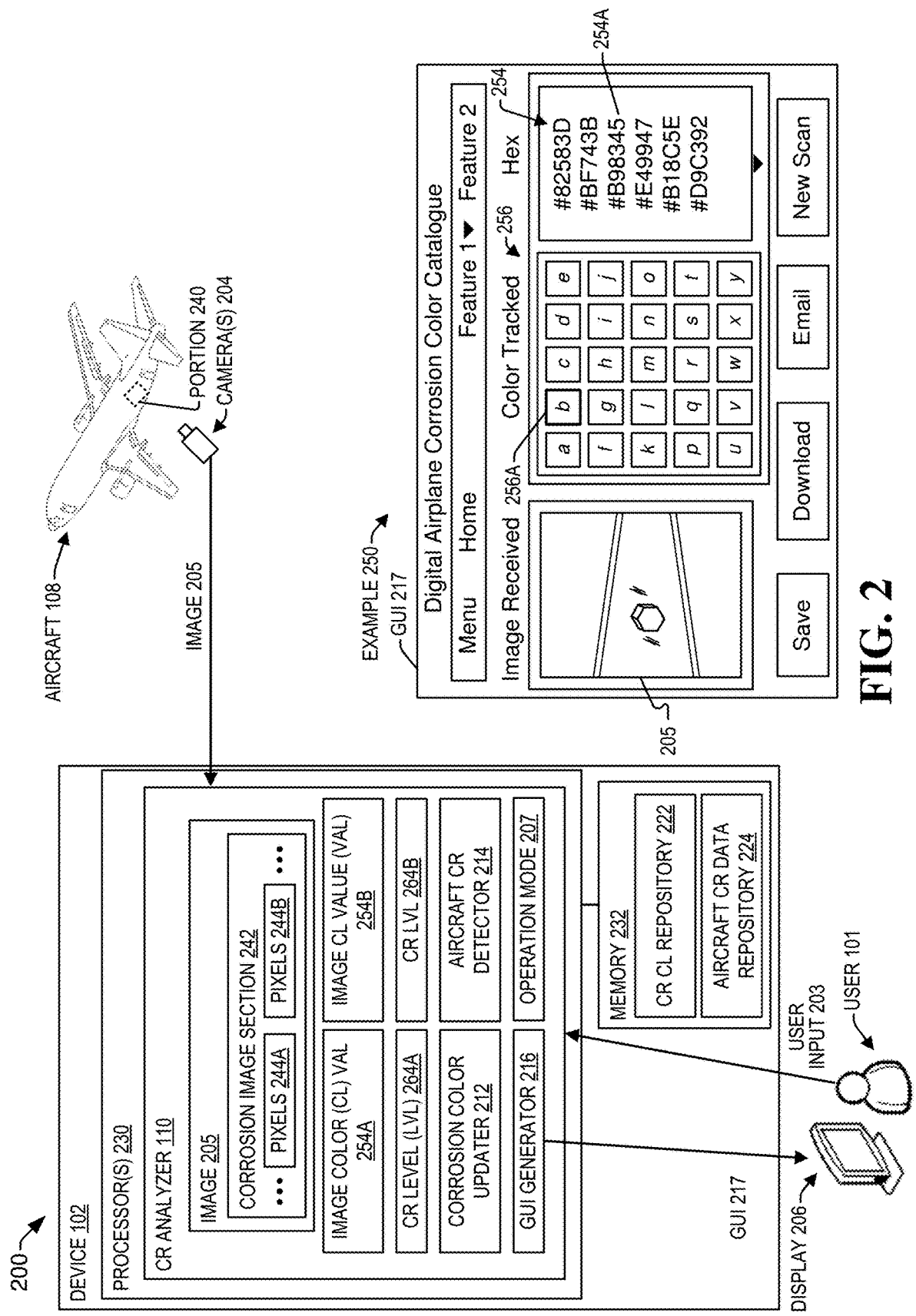
FIG. 2 is a diagram of a particular implementation of a system configured to detect aircraft corrosion and an example of a graphical user interface (GUI).

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts a system 100 including one or more processors ("processor(s)" 230 in FIG. 2), which indicates that in some implementations the system 100 includes a single processor 230 and in other implementations the system 100 includes multiple processors 230. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to detect aircraft erosion. The system 100 includes a device 102 configured to be communicatively coupled to one or more drones. The device 102 includes a corrosion analyzer 110 that is configured to receive one or more images of an aircraft 108 from the one or more drones, and to determine whether corrosion is detected in the one or more images.

During operation, a user 101 (e.g., a technician) uses the device 102 to initialize an inspection of the aircraft 108. For example, the device 102 determines drone flight paths that would enable capturing images of surfaces of the aircraft 108 and sends signals instructing the one or more drones to follow the drone flight paths and to send images. The corrosion analyzer 110 receives the images from the one or more drones. For example, the corrosion analyzer 110 receives an image of the aircraft 108 from a drone 118.

In an "update" mode, the user 101 uses the corrosion analyzer 110 to generate (or update) a corrosion color repository based on the image of the aircraft 108. For example, the corrosion analyzer 110 generates (or updates) a corrosion color repository based on analysis of the image and at least partially based on user input indicating whether corrosion is detected in the image, as further described with reference to FIGS. 2-5.

The corrosion color repository can be used to detect aircraft corrosion. In some examples, the corrosion color repository can be specific to (e.g., associated with) a particular aircraft, a portion of the particular aircraft (e.g., tail, wing, etc.), an airline, an aircraft model, an aircraft model variant, an aircraft manufacturer, a geographical location (e.g., a particular airport or maintenance facility), or a combination thereof. In an example, a corrosion color repository is specific to a particular aircraft (e.g., the aircraft 108) that is used to initialize the corrosion color repository and can be used to detect aircraft corrosion in the particular aircraft and not in other aircraft.

In a "use" mode, the user 101 uses the corrosion analyzer 110 to perform aircraft corrosion detection based on the image of the aircraft 108. For example, the corrosion analyzer 110 uses the corrosion color repository to determine whether corrosion is detected in the image, as further described with reference to FIGS. 2 and 6-9. The corrosion analyzer 110, in response to determining that corrosion is detected, updates an aircraft corrosion data repository associated with the aircraft 108, as further described with reference to FIGS. 2 and 6-9.

Using the corrosion color repository, instead of individual technician decisions, can increase accuracy of the corrosion level detection. For example, the corrosion color repository maps a particular color value descriptive of a color detected in the image to a particular corrosion level. Without the corrosion color repository, the particular color value could be mapped to different corrosion levels by different technicians or by the same technician at different times. Higher accuracy of corrosion level detection enables appropriate resource allocation for any remedial measures and enables reliable tracking of corrosion changes.

Although the corrosion color repository is described as used by the same device 102 that generated the corrosion color repository, in some implementations the corrosion color repository can be generated by a corrosion analyzer 110 of a first device and used by a corrosion analyzer 110 of a second device to detect corrosion. Although the corrosion analyzer 110 of a single device is described as generating the corrosion color repository, in some implementations a corrosion analyzer 110 of a first device and a corrosion analyzer 110 of a second device can update a shared corrosion color repository.

Although the device 102 is depicted as separate from the aircraft 108, in other implementations the device 102 can be integrated in the aircraft 108. For example, the aircraft 108 can include the functionality of the corrosion analyzer 110 to perform an inspection to detect corrosion. Although the device 102 is depicted as co-located with the aircraft 108, in other implementations the device 102 can be geographically remote from the aircraft 108. For example, the device 102 can be located at a maintenance facility that receives the images via at least one network from the one or more drones.

Although the device 102 is depicted as a hand-held device, in other implementations the device 102 can be a computer, an extended reality (XR) device, a communication device, another type of device, or a combination thereof. Although one or more drones are depicted as capturing images of the aircraft 108, in other implementations other types of devices can be used to capture images of the aircraft 108. For example, mounted cameras in an aircraft hangar can be used to capture the images.

In some implementations, each of the corrosion analyzer 110 and the device 102 can be represented in hardware, such as via an application-specific integrated circuit (ASIC) or a field-programmable gate array (FPGA), or the operations described with reference to the elements may be performed by a processor executing computer-readable instructions.

Referring to FIG. 2, a particular implementation of a system 200 is shown. The system 200 is configured to detect aircraft corrosion. FIG. 2 also shows an example 250 of a graphical user interface (GUI) 217 generated by the system 200. In a particular aspect, the system 200 includes one or more components of the system 100 of FIG. 1.

The device 102 is configured to be communicatively coupled to one or more cameras 204, a display device 206, or both. The one or more cameras 204 are configured to capture images of an aircraft 108. In a particular example, a camera 204 is integrated into one or more drones, such as the drone 118 of FIG. 1, one or more additional drones, or a combination thereof. In some examples, a camera 204 is a mounted camera. Although the display device 206 and the one or more cameras 204 are depicted as external to the device 102, in other implementations the one or more cameras 204, the display device 206, or a combination thereof can be integrated in the device 102.

The corrosion analyzer 110 and the one or more cameras 204 are interconnected via one or more networks to enable data communications. For example, the corrosion analyzer 110 is coupled to the one or more cameras 204 via one or more wireless networks, one or more wireline networks, or any combination thereof. The corrosion analyzer 110 and the one or more cameras 204 can be co-located or geographically distributed from each other.

The device 102 includes one or more processors 230 that are coupled to a memory 232. The one or more processors 230 include the corrosion analyzer 110 that can be implemented at least in part by the one or more processors 230 executing instructions stored in the memory 232. The one or more processors 230 can be implemented as a single processor or as multiple processors, such as in a multi-core configuration, a multi-processor configuration, a distributed computing configuration, a cloud computing configuration, or any combination thereof. In some implementations, one or more portions of the corrosion analyzer 110 are implemented by the one or more processors 230 using dedicated hardware, firmware, or a combination thereof.

The corrosion analyzer 110 includes a corrosion (CR) color (CL) updater 212, an aircraft corrosion detector 214, a GUI generator 216, or a combination thereof. The corrosion color updater 212 is configured to process an image to generate (or update) a corrosion color repository 222. For example, the corrosion color repository 222 indicates image color values (VALs) 254 and associated corrosion levels (LVLs) 264. The aircraft corrosion detector 214 is configured to generate (or update) an aircraft corrosion data repository 224 associated with the aircraft 108. For example, the aircraft corrosion data repository 224 indicates when and where corrosion is detected at the aircraft 108 and an associated corrosion level 264.

During operation, the user 101 initiates inspection of the aircraft 108. For example, the user 101 provides a user input 203 to activate the corrosion analyzer 110 to initiate an inspection of the aircraft 108. Upon activation, the corrosion analyzer 110 uses the one or more cameras 204 to capture images of the aircraft 108. For example, the corrosion analyzer 110 steers the one or more cameras 204 such that a portion 240 of the aircraft 108 is within view of the one or more cameras 204 and sends a signal to the one or more cameras 204 to obtain the image 205 of at least the portion 240. In some examples, the corrosion analyzer 110 continues to steer the one or more cameras 204 to obtain images of various portions of the aircraft 108. In some examples, the user 101 provides a user input 203 indicating that the portion 240 is to be inspected and the corrosion analyzer 110 steers the one or more cameras 204 to obtain the image 205 of at least the portion 240 (e.g., the user specified portion).

The corrosion analyzer 110 determines image color values 254 of colors 256 associated with pixels 244 of the image 205. In a particular aspect, the corrosion analyzer 110 divides the image 205 into sets of pixels 244. In some implementations, a pixel count of each of the sets of pixels 244 is 1. In some implementations, a pixel count of each of the sets of pixels 244 is greater than 1. In some implementations, each of the sets of pixels 244 has the same pixel count. In some implementations, a first set of pixels 244 includes a first count of pixels that is distinct from a second count of pixels included in a second set of pixels 244. In some implementations, a first set of pixels 244 can overlap a second set of pixels 244. In some examples, the sets of pixels 244 are non-overlapping. In some aspects, the image 205 includes a corrosion image section 242 that indicates corrosion, and the set of pixels 244A, the set of pixels 244B, one or more additional sets of pixels, or a combination thereof, are included in the corrosion image section 242.

The corrosion analyzer 110 determines image color values 254 descriptive of colors 256 associated with corresponding sets of pixels 244. For example, the corrosion analyzer 110 determines an image color value 254A that is descriptive of a color 256A (e.g., a color "b", such as a particular shade of brown) of a set of pixels 244A of the image 205. As another example, the corrosion analyzer 110 determines an image color value 254B that is descriptive of a color 256B of a set of pixels 244B of the image 205.

The corrosion analyzer 110 performs one or more operations based on an operation (OP) mode 207 of the corrosion analyzer 110, as further described with reference to FIGS. 3-9. In some aspects, the operation mode 207 is based on the user input 203, a configuration setting, default data, or a combination thereof.

When the operation mode 207 corresponds to an "update" mode, the corrosion color updater 212 generates (or updates) the corrosion color repository 222 based on the image 205 and at least partially based on a user input 203, as further described with reference to FIGS. 3-5. In the example 250, the GUI generator 216 generates a GUI 217. The GUI 217 includes the image 205 and indicates image color values 254 descriptive of colors 256 detected in the image 205. For example, the GUI 217 indicates the image color value 254A (e.g., #B98345 in hexadecimal) descriptive of a color 256A that is detected in the image 205. It should be understood that a hexadecimal number representing a Red, Green, and Blue (RGB) scheme is provided as an illustrative example of an image color value. In other examples, an image color value can correspond to a numbering scheme other than hexadecimal, a color scheme other than RGB, or both. The GUI generator 216 provides the GUI 217 to the display device 206.

The corrosion color updater 212 determines corrosion levels 264 associated with the image color values 254 and stores the image color values 254 and the corrosion levels 264 in the corrosion color repository 222, as further described with reference to FIGS. 3-5. For example, the corrosion color updater 212, in response to receiving a user input 203 designating the image color value 254A as associated with a corrosion level 264A (e.g., medium corrosion) and determining that the corrosion level 264A is greater than a corrosion level repository threshold (e.g., no corrosion), stores the image color value 254A and the corrosion level 264A in the corrosion color repository 222 to indicate that the image color value 254A is associated with the corrosion level 264A. As another example, the corrosion color updater 212, in response to receiving a user input 203 designating the image color value 254B as associated with a corrosion level 264B (e.g., no corrosion) and determining that the corrosion level 264B is not greater than the corrosion level repository threshold (e.g., no corrosion), refrains from adding the image color value 254B to the corrosion color repository 222 or, if the image color value 254B is already in the corrosion color repository 222, designates the image color value 254B for removal from the corrosion color repository 222.

When the operation mode 207 corresponds to a "use" mode, the aircraft corrosion detector 214 uses the corrosion color repository 222 to determine whether corrosion is detected in the image 205, as further described with reference to FIGS. 6-9. For example, the aircraft corrosion detector 214, in response to determining that the image color value 254A is detected in the image 205 and that the corrosion color repository 222 indicates that the image color value 254A is associated with the corrosion level 264A (e.g., medium corrosion), determines that corrosion is detected in the image 205.

The aircraft corrosion detector 214, in response to determining that corrosion is detected in the image 205, updates the aircraft corrosion data repository 224, as further described with reference to FIGS. 6-9. For example, the aircraft corrosion detector 214 updates the aircraft corrosion data repository 224 to indicate that the corrosion level 264A (e.g., medium corrosion) is detected at a particular location (e.g., within the portion 240) of the aircraft 108 at a particular date, a particular time, or both. In a particular aspect, the particular date, the particular time, or both, are based on at least one of a timestamp associated with the image 205, a timestamp associated with activation of the corrosion analyzer 110, or a timestamp of updating the aircraft corrosion data repository 224.

Using the corrosion color repository 222, instead of individual technician decisions, can increase accuracy of the corrosion level detection. For example, the corrosion color repository 222 maps the image color value 254A descriptive of the color 256A detected in the image 205 to the corrosion level 264A. Without the corrosion color repository 222, the image color value 254A could be mapped to different corrosion levels by different technicians or by the same technician at different times. Higher accuracy of corrosion level detection enables appropriate resource allocation for any remedial measures and enables reliable tracking of corrosion changes.

Although the corrosion color updater 212, the aircraft corrosion detector 214, and the GUI generator 216 are depicted as separate components, in other implementations the described functionality of two or more of the corrosion color updater 212, the aircraft corrosion detector 214, and the GUI generator 216 can be performed by a single component. In some implementations, each of the corrosion color updater 212, the aircraft corrosion detector 214, the GUI generator 216, or the corrosion analyzer 110 can be represented in hardware, such as via an application-specific integrated circuit (ASIC) or a field-programmable gate array (FPGA), or the operations described with reference to the elements may be performed by a processor executing computer-readable instructions.

Although FIG. 2 illustrates particular examples for clarity of explanation, such examples are not to be considered as limitations. For example, although the corrosion analyzer 110 is described as including the corrosion color updater 212 and the aircraft corrosion detector 214, in other examples the corrosion analyzer 110 includes one of the corrosion color updater 212 or the aircraft corrosion detector 214. For example, a corrosion analyzer 110 in a first device includes the corrosion color updater 212 to generate (or update) the corrosion color repository 222, and a corrosion analyzer 110 in a second device includes the aircraft corrosion detector 214 to use the corrosion color repository 222 to detect corrosion.

Figure 3:
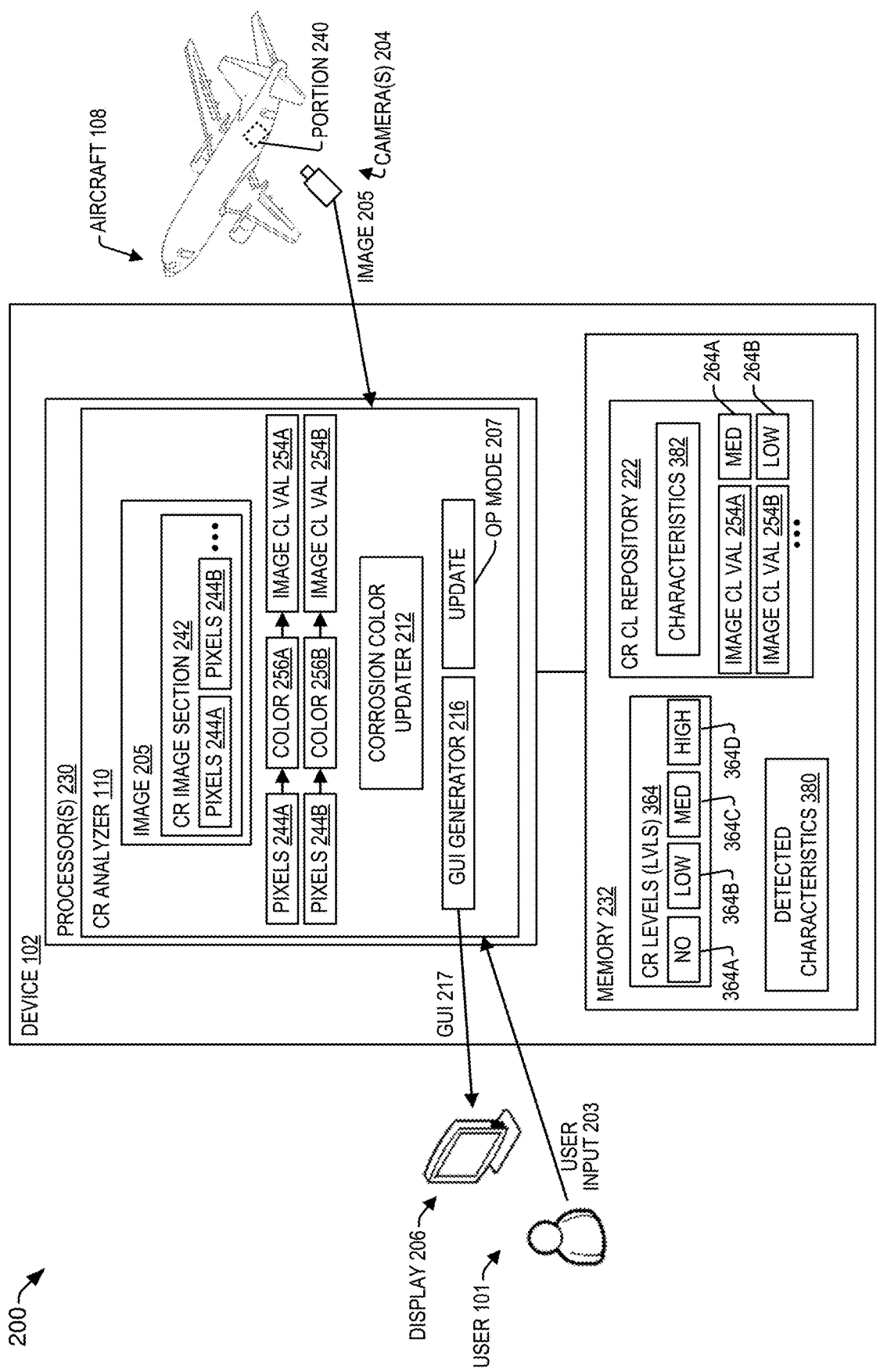
FIG. 3 is a diagram of illustrative aspects of operation of the system of FIG. 2 to generate a corrosion color repository that can be used in aircraft corrosion detection.

Referring to FIG. 3, a diagram is shown of illustrative aspects of operation of the system 200 to generate the corrosion color repository 222 when the operation mode 207 corresponds to an "update" mode. The corrosion analyzer 110 includes the corrosion color updater 212 and the GUI generator 216. The system 200 can include one or more additional components that are not shown in FIG. 3 for ease of illustration. For example, in some implementations, the corrosion analyzer 110 also includes the aircraft corrosion detector 214.

During operation, the user 101 provides a user input 203 to initiate inspection of the aircraft 108 to generate (e.g., initialize or update) the corrosion color repository 222. In a particular aspect, the operation mode 207 of the corrosion analyzer 110 is set to an "update" mode. For example, the operation mode 207 is based on the user input 203, default data, a configuration setting, or a combination thereof.

Upon activation, the corrosion color updater 212 uses the one or more cameras 204 to capture images of the aircraft 108, as described with reference to FIG. 2. In a particular aspect, the corrosion color updater 212 divides the image 205 into sets of pixels 244. In some implementations, the GUI generator 216 generates a GUI 217 that includes the image 205 and provides the GUI 217 to the display device 206. The user 101 provides a user input 203 designating a section of the image 205 as a corrosion image section 242 that indicates corrosion. In these implementations, the corrosion color updater 212 divides the corrosion image section 242 (instead of the entire image 205) into sets of pixels 244.

The sets of pixels 244 includes a set of pixels 244A, a set of pixels 244B, one or more additional sets of pixels 244, or a combination thereof. In some aspects, the user 101 provides a user input 203 indicating a user selection of a set of pixels 244. For example, the user input 203 indicates a first user selection of the set of pixels 244A from the corrosion image section 242 and the second user selection of a set of pixels 244B from the corrosion image section 242.

The corrosion color updater 212 determines image color values 254 descriptive of colors 256 associated with corresponding sets of pixels 244. In an example, the corrosion color updater 212 determines an image color value 254A that is descriptive of a color 256A of the set of pixels 244A. As another example, the corrosion color updater 212 determines an image color value 254B that is descriptive of the color 256B of the set of pixels 244B.

In some implementations, a corrosion color repository is specific to particular characteristics and is to be generated based on images associated with the particular characteristics. For example, the corrosion color updater 212 determines detected characteristics 380 associated with the image 205. To illustrate, the detected characteristics 380 indicate the aircraft 108, the portion 240, an airline of the aircraft 108, an aircraft model of the aircraft 108, an aircraft model variant of the aircraft 108, an aircraft manufacturer of the aircraft 108, a geographical location of the aircraft 108 where the image 205 is captured, a geographical location of the device 102, or a combination thereof. The corrosion color updater 212, in response to determining that characteristics 382 of the corrosion color repository 222 match the detected characteristics 380, updates the corrosion color repository 222 based on the image 205. Alternatively, the corrosion color updater 212, in response to determining no available corrosion color repository has characteristics that match the detected characteristics 380, generates the corrosion color repository 222 and initializes the characteristics 382 of the corrosion color repository 222 based on the detected characteristics 380.

In some aspects, the corrosion color updater 212 generates (e.g., initiates or updates) the corrosion color repository 222 based on a user input 203. For example, the GUI generator 216 generates a GUI 217 indicating the image color values 254. In a particular aspect, the GUI generator 216 includes unique ones of the image color values 254 in the GUI 217. For example, the GUI generator 216 removes repeated image color values from the image color values 254 prior to including the image color values 254 in the GUI 217. In a particular aspect, the GUI generator 216 removes an image color value 254, that is already associated with a corrosion level 264 in the corrosion color repository 222, prior to including the image color values 254 in the GUI 217. In an alternative aspect, the GUI generator 216, instead of removing the image color value 254 that is associated with the corrosion level 264, generates the GUI 217 to indicate that the image color value 254 is associated with the corrosion level 264. The GUI generator 216 provides the GUI 217 to the display device 206.

The user 101 can designate one of corrosion levels 364 as a corrosion level 264 of an image color value 254. In a particular aspect, the corrosion levels 364 include a corrosion level 364A (e.g., no corrosion), a corrosion level 364B (e.g., low corrosion), a corrosion level 364C (e.g., medium corrosion), and a corrosion level 364D (e.g., high corrosion). The corrosion levels 364 including four corrosion levels is provided as an illustrative example. In other examples, the corrosion levels 364 can include fewer than four or more than four corrosion levels. In a particular aspect, the corrosion levels 364 are based on a user input 203, default data, a configuration setting, or a combination thereof.

The corrosion color updater 212, in response to receiving a user input 203 designating the image color value 254A as associated with the corrosion level 364C (e.g., medium corrosion) and determining that the corrosion level 364C is greater than a corrosion level repository threshold (e.g., no corrosion), designates the corrosion level 364C as a corrosion level 264A of the image color value 254A and stores the image color value 254A and the corrosion level 264A (e.g., the corrosion level 364C) in the corrosion color repository 222. Alternatively, the corrosion color updater 212, in response to receiving a user input 203 designating the image color value 254A as associated with the corrosion level 364A (e.g., no corrosion) and determining that the corrosion level 364A is less than or equal to the corrosion level repository threshold (e.g., no corrosion), refrains from adding the image color value 254A to the corrosion color repository 222 or, if the image color value 254A is already included in the corrosion color repository 222, marks the image color value 254A for removal from the corrosion color repository 222.

Similarly, as an example, the corrosion color updater 212, in response to receiving a user input 203 designating the image color value 254B as associated with a corrosion level 364B (e.g., low corrosion) and determining that the corrosion level 364B is greater than the corrosion level repository threshold (e.g., no corrosion), designates the corrosion level 364B as a corrosion level 264B of the image color value 254B and stores the image color value 254B and the corrosion level 264B (e.g., the corrosion level 364B) in the corrosion color repository 222.

In some implementations, the corrosion color updater 212 can estimate a corrosion level 264 associated with an image color value 254 based on corrosion levels indicated in the corrosion color repository 222 as associated with other image color values, as further described with reference to FIG. 4. In these implementations, the GUI generator 216 generates the GUI 217 to indicate that the image color value 254 is associated with the corrosion level 264 (e.g., an estimated corrosion level) and provides the GUI 217 to the display device 206. At least some of the mappings between the image color values 254 and the corrosion levels 264 can thus be automatically estimated. If the estimation is inaccurate, the user 101 can provide a user input 203 to update the corrosion level 264 associated with the image color value 254.

The system 200 thus enables generating (e.g., initializing or updating) the corrosion color repository 222 based on images of the aircraft 108. In some examples, the corrosion color updater 212 can perform similar operations to update the corrosion color repository 222 based on images of one or more additional aircraft.

Figure 4:
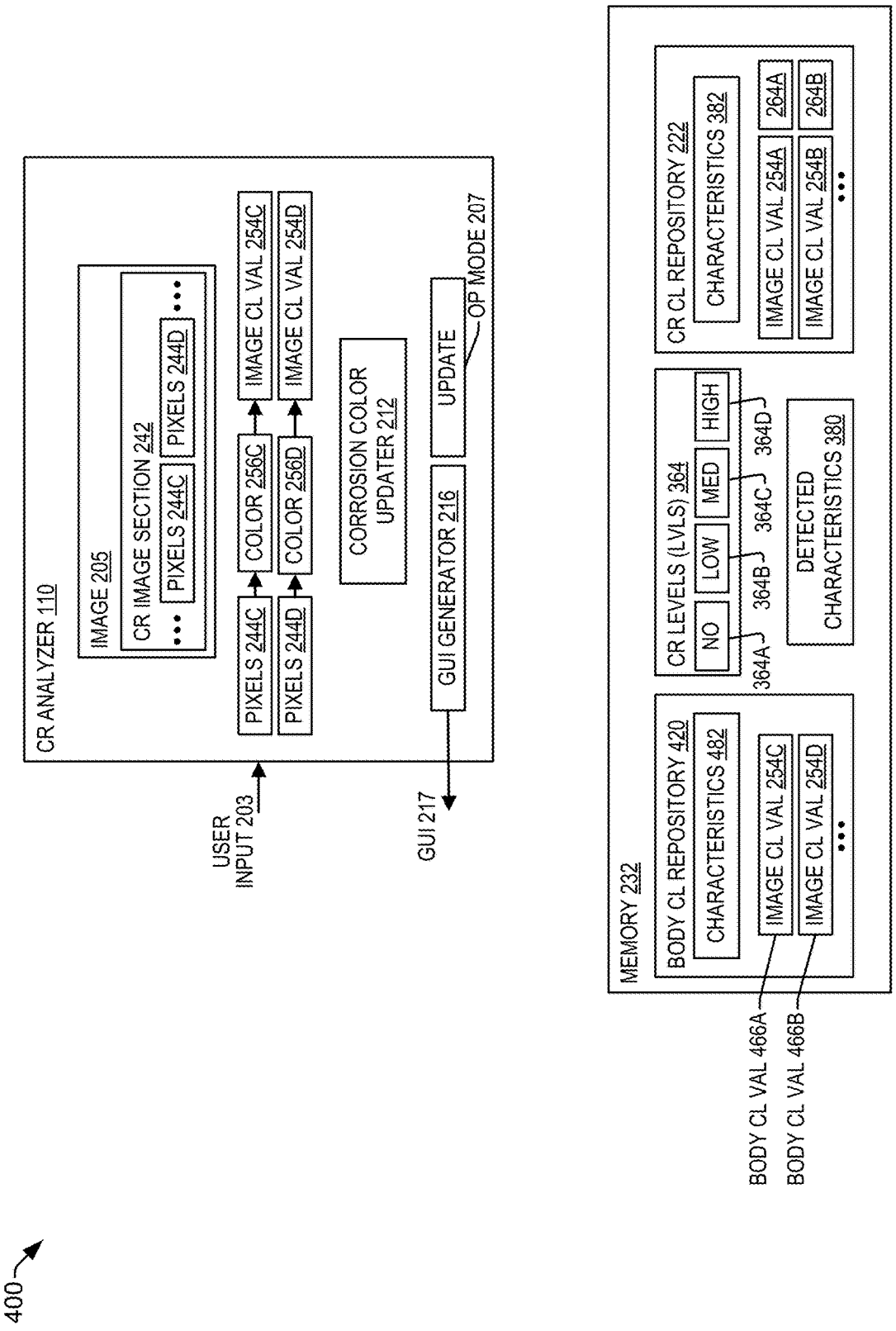
FIG. 4 is a diagram of illustrative aspects of an example of components of the system of FIG. 2.

Referring to FIG. 4, a diagram 400 is shown of an example of components of the system 200 of FIG. 2. A body color repository 420 is configured to indicate one or more body color values 466 that indicate no corrosion. In some implementations, at least one of the one or more body color values 466 is based on default data, a configuration setting, or both.

In some implementations, the corrosion color updater 212 is configured to generate (or update) the body color repository 420 based on a user input 203. The image 205 includes a set of pixels 244C, a set of pixels 244D, one or more additional sets of pixels 244, or a combination thereof, that do not indicate corrosion.

In some aspects, the set of pixels 244C, the set of pixels 244D, and one or more additional sets of pixels are included in the corrosion image section 242. For example, the corrosion image section 242 can include some pixels (e.g., the set of pixels 244A) that indicate corrosion as well as some pixels (e.g., the set of pixels 244C and the set of pixels 244D) that do not indicate corrosion.

The corrosion color updater 212 determines an image color value 254C descriptive of a color 256C associated with the set of pixels 244C. The color 256C associated with the set of pixels 244C indicates no corrosion. For example, the color 256C can be a paint color, a metal color, or another surface material color. The corrosion color updater 212 determines an image color value 254D descriptive of a color 256D associated with the set of pixels 244D. The corrosion color updater 212 generates the GUI 217, as described with reference to FIG. 3, indicating image color values 254 of the set of pixels 244. For example, the GUI 217 indicates the image color value 254C, the image color value 254D, one or more additional image color values, or a combination thereof. In some examples, the GUI 217 indicates one or more image color values (e.g., the image color value 254A and the image color value 254B) that indicate corrosion.

In some implementations, a body color repository is specific to particular characteristics and is to be generated based on images associated with the particular characteristics. For example, the corrosion color updater 212 determines the detected characteristics 380 associated with the image 205, as described with reference to FIG. 3. The corrosion color updater 212, in response to determining that characteristics 482 of the body color repository 420 match the detected characteristics 380, updates the body color repository 420 based on the image 205. Alternatively, the corrosion color updater 212, in response to determining no available body color repository has characteristics that match the detected characteristics 380, generates the body color repository 420 and initializes the characteristics 482 of the body color repository 420 based on the detected characteristics 380.

The corrosion color updater 212, in response to receiving a user input 203 indicating that the image color value 254C indicates no corrosion, adds the image color value 254C as a body color value 466A to the body color repository 420, designates the image color value 254C for removal from the corrosion color repository 222 if the image color value 254C is previously included in the corrosion color repository 222, designates any entries of the aircraft corrosion data repository 224 for removal that are associated with the image color value 254C, or a combination thereof. Similarly, the corrosion color updater 212, in response to receiving a user input 203 indicating that the image color value 254D indicates no corrosion, adds the image color value 254D as a body color value 466B to the body color repository 420, designates the image color value 254D for removal from the corrosion color repository 222 if the image color value 254D is previously included in the corrosion color repository 222, designates any entries of the aircraft corrosion data repository 224 for removal that are associated with the image color value 254C, or a combination thereof. In a particular aspect, the corrosion analyzer 110 refrains from adding any of the one or more body color values 466 to the corrosion color repository 222, the aircraft corrosion data repository 224, or both.

In some aspects, the GUI generator 216 generates the GUI 217 to indicate corrosion color designations of image color values 254. For example, the GUI 217 indicates the image color value 254A is associated with the corrosion level 264A and the image color value 254C is associated with the corrosion level 364A (e.g., no corrosion). The user 101 can use the user input 203 to update a corrosion color designation of an image color value 254. For example, the corrosion color updater 212, in response to receiving a user input 203 indicating that the image color value 254A is associated with the corrosion level 364A (e.g., no corrosion), adds the image color value 254A to the one or more body color values 466 in the body color repository 420 and removes the corrosion level designation of the image color value 254A from the corrosion color repository 222. As another example, the corrosion color updater 212, in response to receiving a user input 203 indicating that the image color value 254C indicates the corrosion level 364C (e.g., medium corrosion), removes the image color value 254C from the one or more body color values 466 in the body color repository 420 and updates the corrosion color repository 222 to indicate that the image color value 254C is associated with the corrosion level 364C. The body color repository 420 and the corrosion color repository 222 can thus be updated if the user 101 updates a corrosion level designation of an image color value 254.

Figure 5:
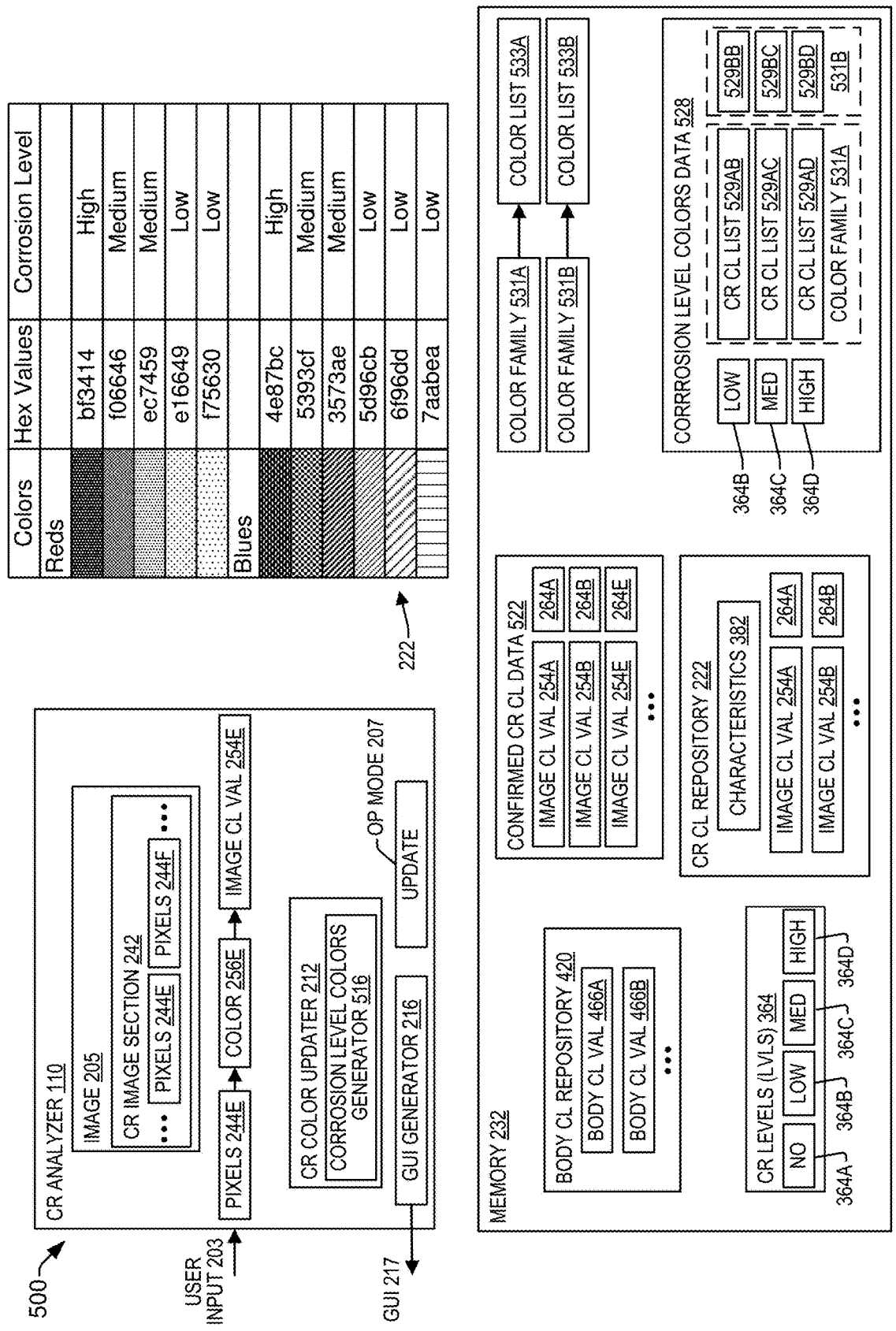
FIG. 5 is a diagram of illustrative aspects of an example of components of the system of FIG. 2.

Referring to FIG. 5, a diagram 500 is shown of an example of components of the system 200 of FIG. 2. The corrosion color updater 212 includes a corrosion level colors generator 516 that is configured to generate (or update) corrosion level colors data 528 associated with one or more color families 531.

In a particular aspect, the one or more color families 531 are based on default data, a configuration setting, a user input 203, or a combination thereof. In an example, a color family 531A (e.g., reds) is associated with an image color value list 533A (e.g., #bf3414, #f06646, #ec7459, #e16649, #f75630). As another example, a color family 531B (e.g., blues) is associated with an image color value list 533B (e.g., #4e87bc, #5393cf, #3573ae, #5d96cb, #6f96dd, #7aabea). In a particular aspect, image color value lists 533 of the one or more color families 531 are based on default data, a configuration setting, a user input 203, or a combination thereof.

The corrosion level colors data 528 includes corrosion color lists 529 associated with the corrosion levels 364. It should be understood that "lists" are used as an illustrative example, in other examples other types of logical structures can be used.

In an example, the corrosion level colors data 528 indicates, for the color family 531A (e.g., reds), that a corrosion color list 529AB, a corrosion color list 529AC, and a corrosion color list 529AD are associated with the corrosion level 364B, the corrosion level 364C, and the corrosion level 364D, respectively. As another example, the corrosion level colors data 528 indicates, for the color family 531B (e.g., blues), that a corrosion color list 529BB, a corrosion color list 529BC, and a corrosion color list 529BD are associated with the corrosion level 364B, the corrosion level 364C, and the corrosion level 364D, respectively. The corrosion level colors data 528 indicating corrosion color lists for two color families 531 is provided as an illustrative example, in other examples the corrosion level colors data 528 can indicate corrosion color lists for fewer than two or more than two color families.

In some implementations, the corrosion level colors data 528 is based on default data, a configuration setting, or a combination thereof. For example, the corrosion level colors data 528 is pre-populated to indicate the corrosion color lists 529 for the color families 531.

In some implementations, the corrosion level colors generator 516 initializes the corrosion level colors data 528. For example, the corrosion level colors generator 516 sorts the image color value list 533A of the color family 531A based on a color characteristic (e.g., saturation) corresponding to corrosion level. In a particular implementation, a lower sort position corresponds to a lower corrosion level. The corrosion level colors generator 516 divides the sorted version of the image color value list 533A into lists associated with the corrosion levels 364. For example, the corrosion level colors generator 516 divides the image color value list 533A (e.g., #f75630, #e16649, #ec7459, #f06646, #bf3414) into the corrosion color list 529AB (e.g., #f75630, #e16649) associated with the corrosion level 364B (e.g., low corrosion), the corrosion color list 529AC (e.g., #ec7459, #f06646) associated with the corrosion level 364C (e.g., medium corrosion), and the corrosion color list 529AD (e.g., #bf3414) associated with the corrosion level 364D (e.g., high corrosion). As another example, the corrosion level colors generator 516 sorts the image color value list 533B of the color family 531B based on a color characteristic (e.g., saturation) corresponding to corrosion level, and divides the sorted version of the image color value list 533B into the corrosion color list 529BB (e.g., #7aabea, #6f96dd, #5d96cb) associated with the corrosion level 364B (e.g., low corrosion), the corrosion color list 529BC (e.g., #3573ae, #5393cf) associated with the corrosion level 364C (e.g., medium corrosion), and the corrosion color list 529BD (e.g., #4e87bc) associated with the corrosion level 364D (e.g., high corrosion).

In an example, the corrosion level colors generator 516 determines that an image color value 254E is descriptive of a color 256E of a set of pixels 244E of the image 205. The corrosion level colors generator 516, in response to determining that the image color value 254E is included in the image color value list 533A of the color family 531A, determines which of the corrosion color lists 529A includes the image color value 254E. The corrosion level colors generator 516, in response to determining that the corrosion color list 529AB includes the image color value 254E, estimates that the image color value 254E is associated with the corrosion level 364B (e.g., low corrosion).

The GUI generator 216 generates the GUI 217 indicating that the image color value 254E is estimated as associated with the corrosion level 364B. The corrosion color updater 212, in response to receiving a user input 203 indicating that the corrosion level designation (e.g., the corrosion level 364B) of the image color value 254E is correct, updates confirmed corrosion color data 522 to indicate that the corrosion level 364B (e.g., low corrosion) is designated as a corrosion level 264E of the image color value 254E. Alternatively, the corrosion color updater 212, in response to receiving a user input 203 indicating that the corrosion level designation (e.g., the corrosion level 364B) of the image color value 254E is incorrect and that the image color value 254E is to be associated with another one (e.g., the corrosion level 364C) of the corrosion levels 364, updates the confirmed corrosion color data 522 to indicate that the corrosion level 364C (e.g., medium corrosion) is designated as the corrosion level 264E of the image color value 254E.

The corrosion level colors generator 516 generates (or updates) the corrosion color lists 529A of the color family 531A based on image color values of the color family 531A that are included in the confirmed corrosion color data 522.

The corrosion level colors generator 516, in response to receiving a user input 203 indicating that the corrosion color designation is correctly estimated for the image color value 254E of the color family 531A, refrains from adjusting the corrosion color lists 529A of the color family 531A. Alternatively, the corrosion level colors generator 516, in response to receiving a user input 203 indicating that the corrosion color designation is incorrectly estimated for the image color value 254E of the color family 531A, adjusts the corrosion color lists 529A of the color family 531A based on image color values of the color family 531A that are included in the confirmed corrosion color data 522.

In an example, the confirmed corrosion color data 522 indicates that the image color value 254A, the image color value 254B, and the image color value 254E of the color family 531A are designated as associated with the corrosion level 364B, the corrosion level 364B, and the corrosion level 364C, respectively.

The corrosion level colors generator 516 performs the adjustment to include first image color values of the image color value list 533A in the corrosion color list 529AB, to include second image color values of the image color value list 533A included in the corrosion color list 529AC, and to include third image color values of the image color value list 533A in the corrosion color list 529AD. The sort positions of each of the first image color values in the image color value list 533A are lower than sort positions of all of the second image color values. The sort positions of each of the second image color values in the image color value list 533A are lower than sort positions of all of the third image color values. The adjustment is performed such that the first image color values include the image color value 254A and the image color value 254B and the second image color values include the image color value 254E.

In a particular implementation, the corrosion level colors generator 516 determines whether corrosion level designations in the confirmed corrosion color data 522 of a pair of image color values 254 match relative sort positions of the pair of image color values 254 in the image color value list 533A. In an example, the confirmed corrosion color data 522 indicates that the image color value 254A and the image color value 254E of the color family 531A are designated as associated with the corrosion level 364B (e.g., low corrosion) and the corrosion level 364C (e.g., medium corrosion), respectively. The corrosion level colors generator 516 determines that the image color value 254A has a first sort position and the image color value 254E has a second sort position in the sorted version of the first image color values. The GUI generator 216, in response to determining that the first sort position corresponds to higher corrosion level than the second sort position, generates the GUI 217 requesting the user 101 to update the corrosion level designation of at least one of the image color value 254A or the image color value 254E, or to update the color characteristic or sort direction (e.g., ascending or descending) used for sorting the image color value list 533A.

The corrosion level colors generator 516, in response to receiving a user input 203 indicating an updated color characteristic, an updated sort direction, or both, re-sorts the image color value list 533A based on the updated color characteristic, the updated sort direction, or both. The corrosion level colors generator 516, in response to receiving a user input 203 indicating an updated corrosion level designation, updates the confirmed corrosion color data 522. The corrosion level colors generator 516, in response to determining that the image color value list 533A is re-sorted, the confirmed corrosion color data 522 is updated, or both, updates the corrosion color lists 529A based on the image color value list 533A and the confirmed corrosion color data 522.

In a particular aspect, the corrosion color updater 212 generates (or updates) the corrosion color repository 222 based on the corrosion level colors data 528. For example, the corrosion color repository 222 maps the image color values 254 included in the corrosion color lists 529 to respective corrosion levels 264. To illustrate, the corrosion color repository 222 indicates that each image color value 254 of the corrosion color list 529AB, each image color value 254 of the corrosion color list 529BB, and so on is designated as associated with the corrosion level 364B (e.g., low corrosion) as a respective corrosion level 264. As another example, the corrosion color repository 222 indicates that each image color value 254 of the corrosion color list 529AC, each image color value 254 of the corrosion color list 529BC, and so on is designated as associated with the corrosion level 364C (e.g., medium corrosion) as a respective corrosion level 264.

Accuracy of the corrosion level colors data 528 increases as more mappings of image color values to corrosion levels are added to the confirmed corrosion color data 522. As a result, the user 101 has to update fewer estimated corrosion levels to generate (or update) the corrosion color repository 222.

Figure 6:
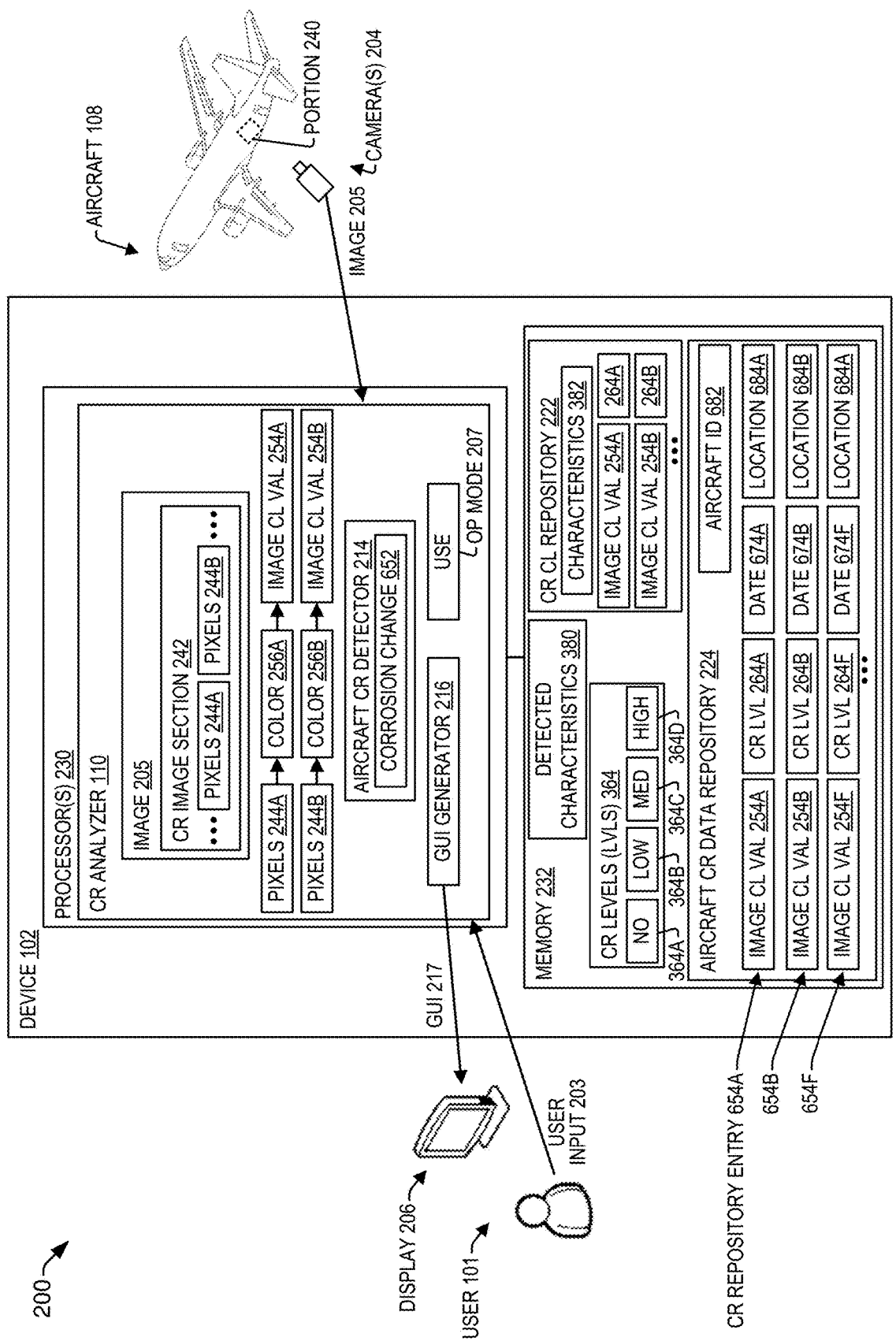
FIG. 6 is a diagram of illustrative aspects of operation of the system of FIG. 2 to use a corrosion color repository to perform aircraft corrosion detection and to generate an aircraft corrosion data repository that indicates detected aircraft corrosion.

Referring to FIG. 6, a diagram of illustrative aspects of operation of the system 200 to use the corrosion color repository 222 to perform aircraft corrosion detection when the operation mode 207 corresponds to a "use" mode. The corrosion analyzer 110 includes the aircraft corrosion detector 214 and the GUI generator 216. The system 200 can also include additional components that are not shown in FIG. 6 for ease of illustration. For example, in some implementations, the corrosion analyzer 110 also includes the corrosion color updater 212.

During operation, the user 101 provides a user input 203 to initiate inspection of the aircraft 108 to perform aircraft corrosion detection. In a particular aspect, the operation mode 207 of the corrosion analyzer 110 is set to a "use" mode. For example, the operation mode 207 is based on the user input 203, default data, a configuration setting, or a combination thereof.

Upon activation, the aircraft corrosion detector 214 uses the one or more cameras 204 to capture images of the aircraft 108, as described with reference to FIG. 2. In a particular aspect, the aircraft corrosion detector 214 divides the image 205 into sets of pixels 244. The sets of pixels 244 includes a set of pixels 244A, a set of pixels 244B, one or more additional sets of pixels 244, or a combination thereof. In a particular aspect, the image 205 includes a corrosion image section 242 that indicates corrosion and that includes the set of pixels 244A, the set of pixels 244B, one or more additional sets of pixels, or a combination thereof.

The aircraft corrosion detector 214 determines image color values 254 descriptive of colors 256 associated with corresponding sets of pixels 244. In an example, the aircraft corrosion detector 214 determines an image color value 254A that is descriptive of a color 256A of the set of pixels 244A.

In some implementations, a corrosion color repository is specific to particular characteristics and is to be used to detect aircraft corrosion in images associated with matching characteristics. For example, the aircraft corrosion detector 214 determines detected characteristics 380 associated with the image 205. To illustrate, the detected characteristics 380 indicate the aircraft 108, the portion 240, an airline of the aircraft 108, an aircraft model of the aircraft 108, an aircraft model variant of the aircraft 108, an aircraft manufacturer of the aircraft 108, a geographical location of the aircraft 108 where the image 205 is captured, a geographical location of the device 102, or a combination thereof. The aircraft corrosion detector 214, in response to determining that characteristics 382 of the corrosion color repository 222 match the detected characteristics 380, selects the corrosion color repository 222 from among a plurality of corrosion color repositories 222 to determine whether the image 205 indicates aircraft corrosion. The aircraft corrosion detector 214, in response to determining that the aircraft corrosion data repository 224 is associated with an aircraft identifier 682 of the aircraft 108, selects the aircraft corrosion data repository 224 to update responsive to detecting aircraft corrosion. Alternatively, the aircraft corrosion detector 214, in response to determining that no available aircraft corrosion data repository is associated with the aircraft identifier 682 of the aircraft 108, generates the aircraft corrosion data repository 224 associated with the aircraft identifier 682 to track any detected corrosion.

The aircraft corrosion detector 214, in response to determining that the image color value 254A is detected in the image 205 and that the corrosion color repository 222 indicates that the image color value 254A is associated with the corrosion level 264A (e.g., medium corrosion) that exceeds a corrosion level repository threshold (e.g., no corrosion), determines that corrosion is detected in the image 205.

The aircraft corrosion detector 214, in response to determining that corrosion is detected in the image 205, updates the aircraft corrosion data repository 224. For example, the aircraft corrosion detector 214 adds a corrosion repository entry 654A to the aircraft corrosion data repository 224 indicating that corrosion is detected at the aircraft 108. For example, the corrosion repository entry 654A indicates that the corrosion level 264A is detected at a date 674A at a location 684A. In some implementations, the corrosion repository entry 654A also indicates the image color value 254A.

In a particular aspect, the date 674A is based on at least one of a timestamp associated with the image 205, a timestamp associated with activation of the aircraft corrosion detector 214, or a timestamp of updating the aircraft corrosion data repository 224. In a particular aspect, the corrosion repository entry 654A can include a timestamp indicating a time in addition to the date 674A.

In a particular aspect, the location 684A on the aircraft 108 corresponds to the set of pixels 244A. For example, the aircraft corrosion detector 214, in response to determining that the set of pixels 244A is included in the image 205 that is associated with the portion 240 of the aircraft 108, generates the location 684A to indicate the portion 240. In a particular aspect, the aircraft corrosion detector 214 determines a bounding box of the set of pixels 244A within the image 205 and determines that the bounding box corresponds to the location 684A within the portion 240.

In another example, the aircraft corrosion detector 214, in response to determining that the corrosion level 264B (e.g., low corrosion) is greater than a corrosion level repository threshold (e.g., no corrosion), adds a corrosion repository entry 654B to the aircraft corrosion data repository 224 indicating that corrosion is detected at the aircraft 108. For example, the corrosion repository entry 654B indicates that the corrosion level 264B is detected at a date 674B at a location 684B.

In a particular aspect, the aircraft corrosion detector 214, in response to determining that the corrosion level 264A is greater than or equal to a corrosion level remedial threshold (e.g., medium corrosion), generates an alert, schedules maintenance, or both. In a particular aspect, the aircraft corrosion detector 214, based on a comparison of the corrosion level 264A and a plurality of corrosion priority thresholds, assigns a priority to the alert, the scheduled maintenance, or both. For example, the aircraft corrosion detector 214, in response to determining that the corrosion level 264A is equal to the corrosion level 364C (e.g., medium corrosion), assigns a medium priority to the alert, the scheduled maintenance, or both. As another example, the aircraft corrosion detector 214, in response to determining that the corrosion level 264B is equal to the corrosion level 364D (e.g., high corrosion), assigns a high priority to the alert, the scheduled maintenance, or both.

In a particular aspect, the aircraft corrosion detector 214, in response to determining that the corrosion repository entry 654A indicates that corrosion is detected at the location 684A, determines an entry (if any) of the aircraft corrosion data repository 224 that indicates most recent previously detected corrosion at the location 684A. For example, a corrosion repository entry 654F of the aircraft corrosion data repository 224 indicates that corrosion at the location 684A was previously detected on a date 674F. The aircraft corrosion detector 214, in response to determining that the aircraft corrosion data repository 224 does not include any entry that indicates corrosion at the location 684A with a date later than the date 674F, determines that the corrosion repository entry 654F is the entry that indicates the most recent previously detected corrosion at the location 684A.

The aircraft corrosion detector 214 determines a corrosion change 652 based on a comparison of corrosion levels indicated by the two most recent entries (e.g., the corrosion repository entry 654A and the corrosion repository entry 654F) that indicate corrosion at the location 684A. For example, the aircraft corrosion detector 214 determines the corrosion change 652 based on a comparison of the corrosion level 264A indicated by the corrosion repository entry 654A and a corrosion level 264F indicated by the corrosion repository entry 654F.

In some examples, the aircraft corrosion detector 214 previously added the corrosion repository entry 654F to the aircraft corrosion data repository 224. For example, the corrosion level 264F was detected by the aircraft corrosion detector 214 based on a previously obtained image of the aircraft 108 and using the corrosion color repository 222 (or an earlier version of the corrosion color repository 222). In some examples, the corrosion color updater 212 previously added the corrosion repository entry 654F to the aircraft corrosion data repository 224. For example, the corrosion color updater 212 determined the image color value 254F descriptive of colors of a set of pixels in a previously obtained image of the aircraft 108 and received a user input 203 indicating that the image color value 254F corresponds to the corrosion level 264F, as described with reference to FIG. 3. In this example, the corrosion color updater 212, in addition to updating the corrosion color repository 222 to indicate that the image color value 254F is associated with the corrosion level 264F, also added the corrosion repository entry 654F to the aircraft corrosion data repository 224 to indicate that the corrosion level 264F is detected at the location 684A at the date 674F.

In a particular aspect, the aircraft corrosion detector 214, in response to determining that the corrosion change 652 is greater than or equal to a corrosion change remedial threshold (e.g., changed two levels from no corrosion to medium corrosion), generates an alert, schedules maintenance, or both. In a particular aspect, a priority of the alert, a priority of the scheduled maintenance, or both, are based on an amount of change indicated by the corrosion change 652. For example, a greater change indicated by the corrosion change 652 corresponds to a higher priority.

The system 200 thus enables using the corrosion color repository 222 to detect aircraft corrosion based on images of the aircraft 108. In some examples, the aircraft corrosion detector 214 can use the corrosion color repository 222 that is updated based on images of another aircraft to detect corrosion in images of the aircraft 108.

Figure 7:
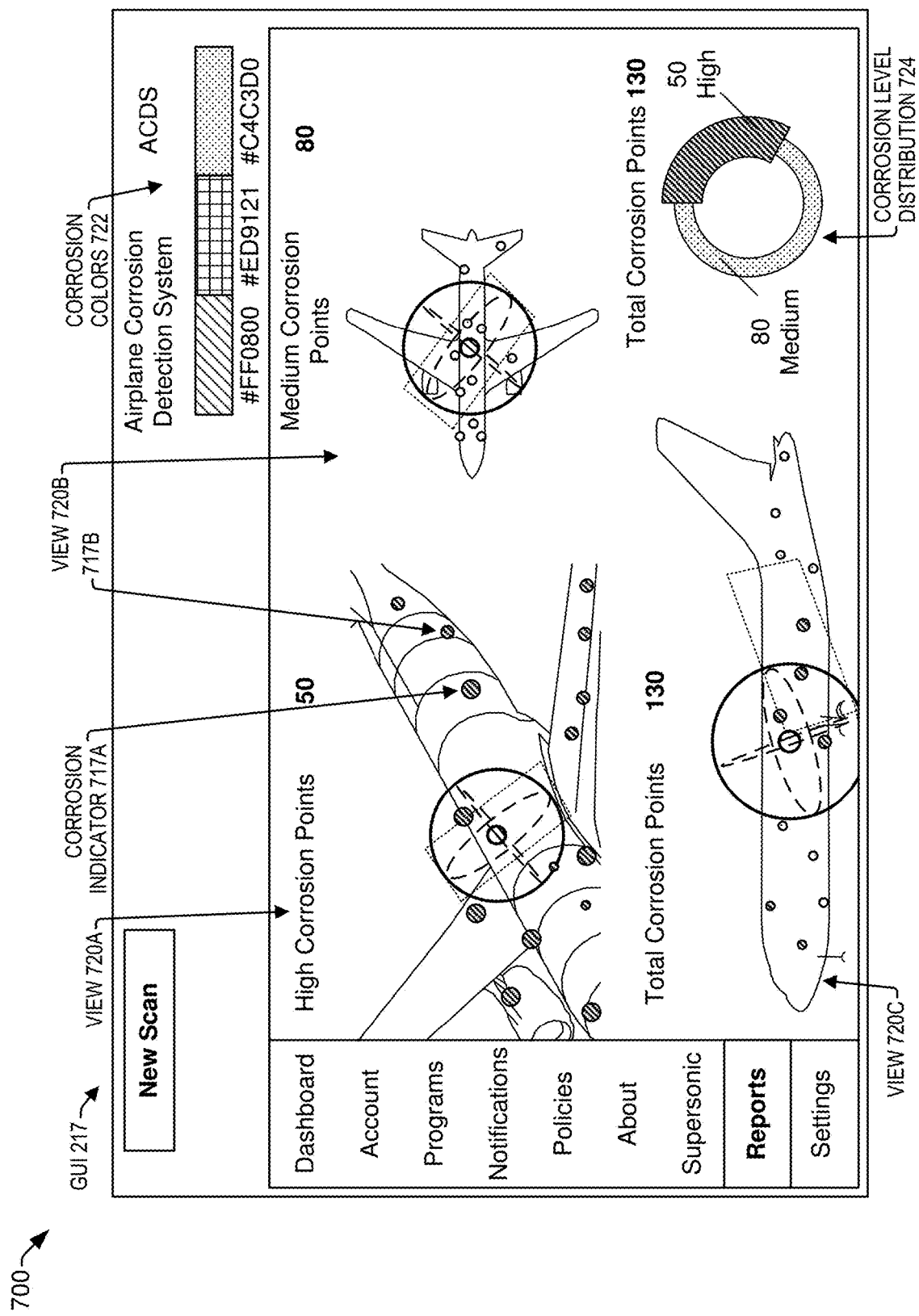
FIG. 7 is a diagram of an example of a GUI that can be generated by the system of FIG. 2.

Referring to FIG. 7, a diagram 700 is shown of an example of a GUI 217 that can be generated by the system 200 of FIG. 2. In a particular aspect, the GUI generator 216 generates, based on the aircraft corrosion data repository 224, the GUI 217 to indicate corrosion detected at various locations of the aircraft 108.

In an example, the GUI generator 216 obtains (e.g., retrieves or generates) a model of the aircraft 108 and generates the GUI 217 to indicate corrosion levels associated with locations of the model corresponding to locations of the aircraft 108. To illustrate, the GUI generator 216, in response to determining that a first location on the model corresponds to the location 684A on the aircraft 108, generates the GUI 217 to include a corrosion indicator 717A indicating that the corrosion level 264A is associated with the first location on the model.

In some implementations, the model in the GUI 217 is rotatable in various directions to view different surfaces of the model corresponding to different surfaces of the aircraft 108. In some implementations, a zoom level of a view of the model can be increased or decreased based on user input.

In some implementations, a corrosion indicator 717 can correspond to multiple locations on the aircraft 108. For example, the corrosion indicator 717A is associated with first locations (e.g., the location 684A and the location 684B) that appear proximate to each other at a particular zoom level. In some examples, at a higher zoom level, two or more of the first locations can be indicated in the GUI 217 using separate corrosion indicators 717.

In some implementations, a size of the corrosion indicator indicates a count of locations associated with the corrosion indicator. For example, a first size of the corrosion indicator 717A is greater than a second size of a corrosion indicator 717B indicating that the corrosion indicator 717A is associated with a higher count of locations than are associated with the corrosion indicator 717B.

In a particular implementation, the GUI generator 216 generates the GUI 217 including one or more views 720 corresponding to various corrosion levels 364. For example, the GUI 217 includes a view 720A associated with the corrosion level 364D (e.g., high corrosion). The view 720A includes one or more corrosion indicators 717 associated with first corrosion locations at which the corrosion level 364D (e.g., high corrosion) is detected. As another example, the GUI 217 includes a view 720B that includes one or more corrosion indicators 717 associated with second corrosion locations at which the corrosion level 364C (e.g., medium corrosion) is detected. In an example, the GUI 217 includes a view 720C that includes one or more corrosion indicators 717 associated with the first corrosion locations and the second corrosion locations.

In a particular implementation, the GUI generator 216 generates the GUI 217 indicating corrosion colors 722 associated with the first corrosion locations and the second corrosion locations. For example, the corrosion repository entry 654A indicates that the corrosion level 264A corresponding to the image color value 254A is detected at the location 684A. The GUI generator 216, in response to determining that the corrosion level 264A is equal to the corrosion level 364D (e.g., high corrosion), determines that the first locations depicted in the view 720A and the view 720C include the location 684A and that the corrosion colors 722 include the color 256A associated with the image color value 254A.

In a particular implementation, the GUI generator 216 generates the GUI 217 to indicate a corrosion level distribution 724. For example, the corrosion level distribution 724 indicates a first count (e.g., 50) of the first locations, a second count (e.g., 80) of the second locations, and a sum (e.g., 130) of the first count and the second count.

In some implementations, the GUI generator 216 generates the GUI 217 to indicate corrosion changes in various locations of the aircraft 108. For example, the GUI 217 can indicate (not shown in FIG. 7) the corrosion change 652 of the location 684A. To illustrate, the corrosion change 652 can be indicated by a particular color of the corrosion indicator 717A, a particular icon associated with the corrosion indicator 717A, a corrosion change indicator associated with the location 684A, or a combination thereof.

Figure 8:
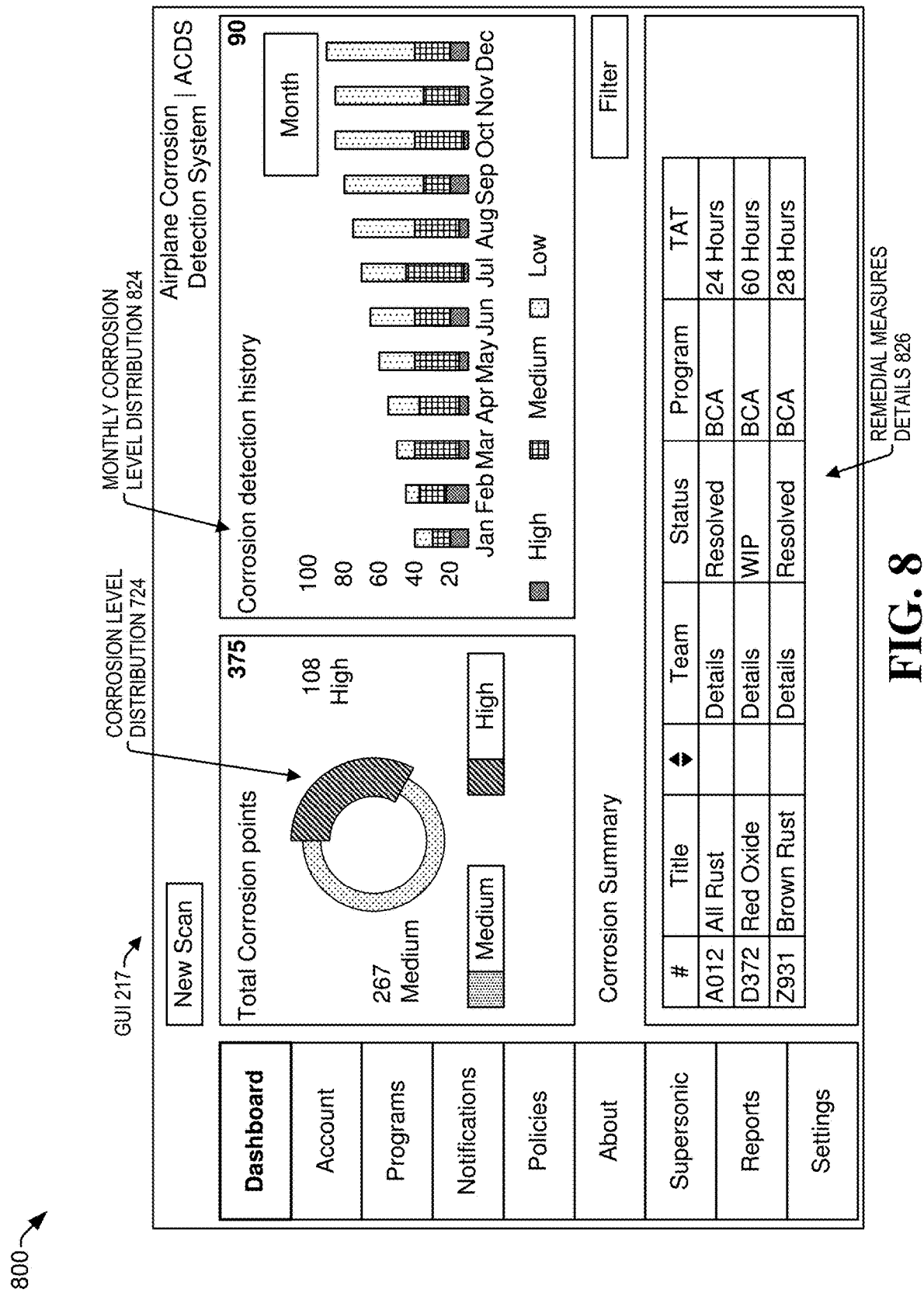
FIG. 8 is a diagram of another example of a GUI that can be generated by the system of FIG. 2.

Referring to FIG. 8, a diagram 800 is shown of an example of a GUI 217 that can be generated by the system 200 of FIG. 2. The GUI generator 216 generates the GUI 217 to indicate a monthly corrosion level distribution 824.

In an example, the GUI generator 216 selects first entries from the aircraft corrosion data repository 224 that include dates 674 corresponding to a particular month (e.g., January 2022), determines a first count of the first entries that indicate a corrosion level 364B (e.g., low corrosion), a second count of the first entries that indicate a corrosion level 364C (e.g., medium corrosion), and a third count of the first entries that indicate a corrosion level 364D (e.g., high corrosion). The GUI generator 216 generates the GUI 217 to include the monthly corrosion level distribution 824 indicating the first count, the second count, and the third count corresponding to the corrosion level 364B, the corrosion level 364C, and the corrosion level 364D for the particular month (e.g., January 2022). Similarly, the monthly corrosion level distribution 824 indicates corrosion level distributions for one or more additional months.

In a particular aspect, the GUI generator 216 generates the GUI 217 to indicate remedial measures details 826. For example, the remedial measures details 826 indicate types of remedial measures (e.g., treatment of red oxide), status (e.g., work in progress, resolved, etc.), turn around time, one or more additional details, or a combination thereof.

Figure 9:
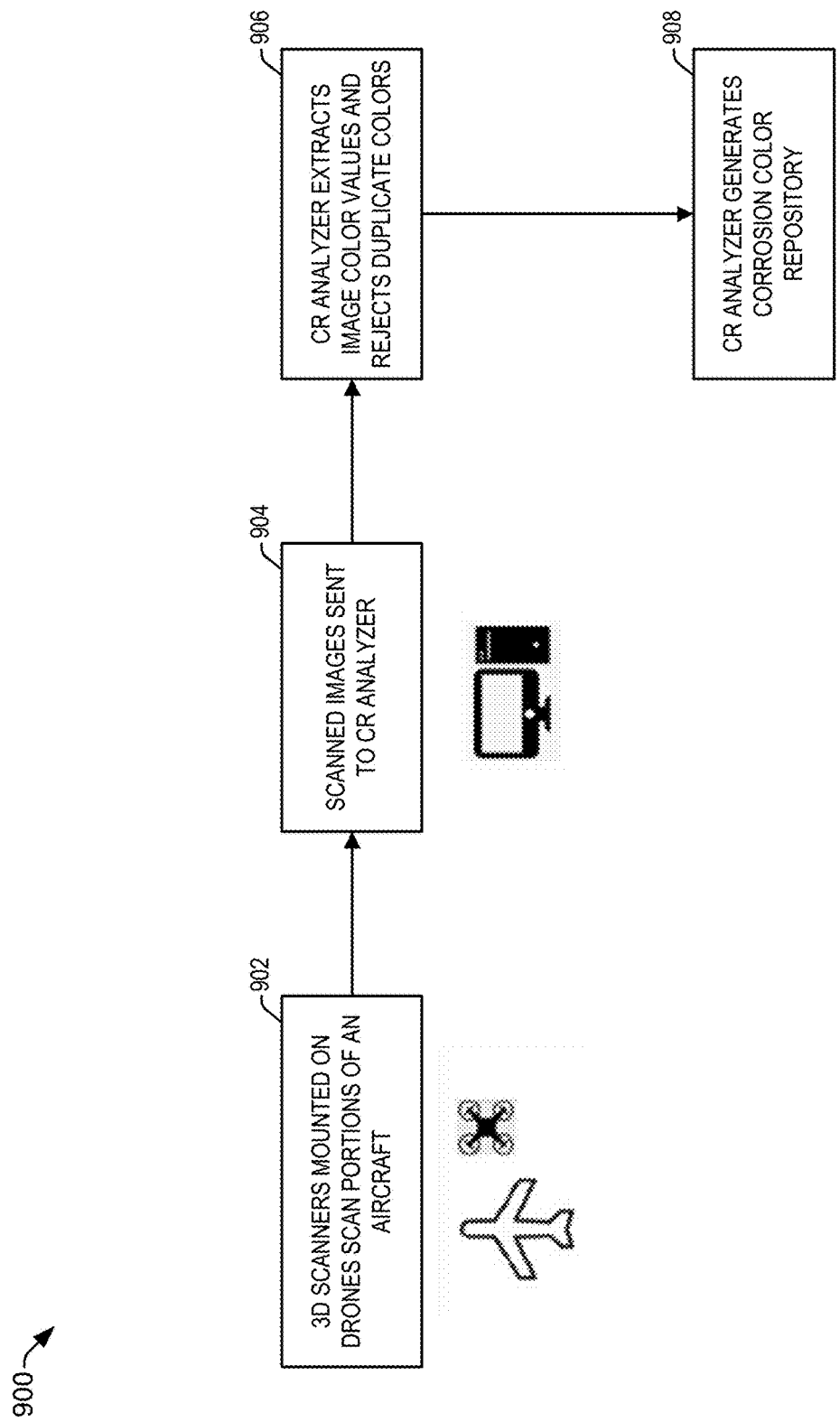
FIG. 9 is a diagram that illustrates a flow chart of an example of a method of generating a corrosion color repository.

Referring to FIG. 9, an example is shown of a method 900 of generating a corrosion color repository. In a particular aspect, one or more operations of the method 900 are performed by the drone 118, the corrosion analyzer 110, the device 102, the system 100 of FIG. 1, the one or more cameras 204, the corrosion color updater 212, the one or more processors 230, the system 200 of FIG. 2, or a combination thereof.

For example, at 902, three-dimensional (3D) scanners mounted on drones scan portions of an aircraft. To illustrate, the one or more cameras 204 of FIG. 2 mounted on drones (e.g., including the drone 118) capture images of portions of the aircraft 108.

At 904, the scanned images are sent to the corrosion analyzer 110. For example, the corrosion analyzer 110 of FIG. 1 receives images (e.g., including the image 205) from the one or more cameras 204.

At 906, the corrosion analyzer extracts image color values and rejects duplicate colors. For example, the corrosion color updater 212 of FIG. 2 determines the image color values 254 descriptive of colors 256 of sets of pixels of the image 205. In a particular aspect, the corrosion color updater 212 removes duplicates from the image color values 254.

At 908, the corrosion analyzer generates a corrosion color repository. For example, the corrosion color updater 212 of FIG. 2 generates the corrosion color repository 222, as described with reference to FIGS. 2-3 and 5. To illustrate, the GUI generator 216 generates a GUI 217 indicating the image color values 254, the user 101 provides a user input 203 indicating corrosion levels 264 of the image color values 254, and the GUI generator 216 generates the corrosion color repository 222 indicating the image color values 254 and corresponding corrosion levels 264, as described with reference to FIGS. 2-3. In some implementations, the corrosion color updater 212 generates confirmed corrosion color data 522 based on the user input 203 and determines the corrosion level colors data 528 indicating estimated mappings between one or more image color values 254 and corresponding corrosion levels 264, as described with reference to FIG. 5. In these implementations, the corrosion color repository 222 can include user-specified mappings between a first set of image color values 254 and corresponding corrosion levels 264, estimated mappings between a second set of image color values 254 and corresponding corrosion levels 264, or both.

The method 900 thus enables generation of the corrosion color repository 222 based on scanned images. The corrosion color repository 222 is available for use in aircraft corrosion detection.

Figure 10:
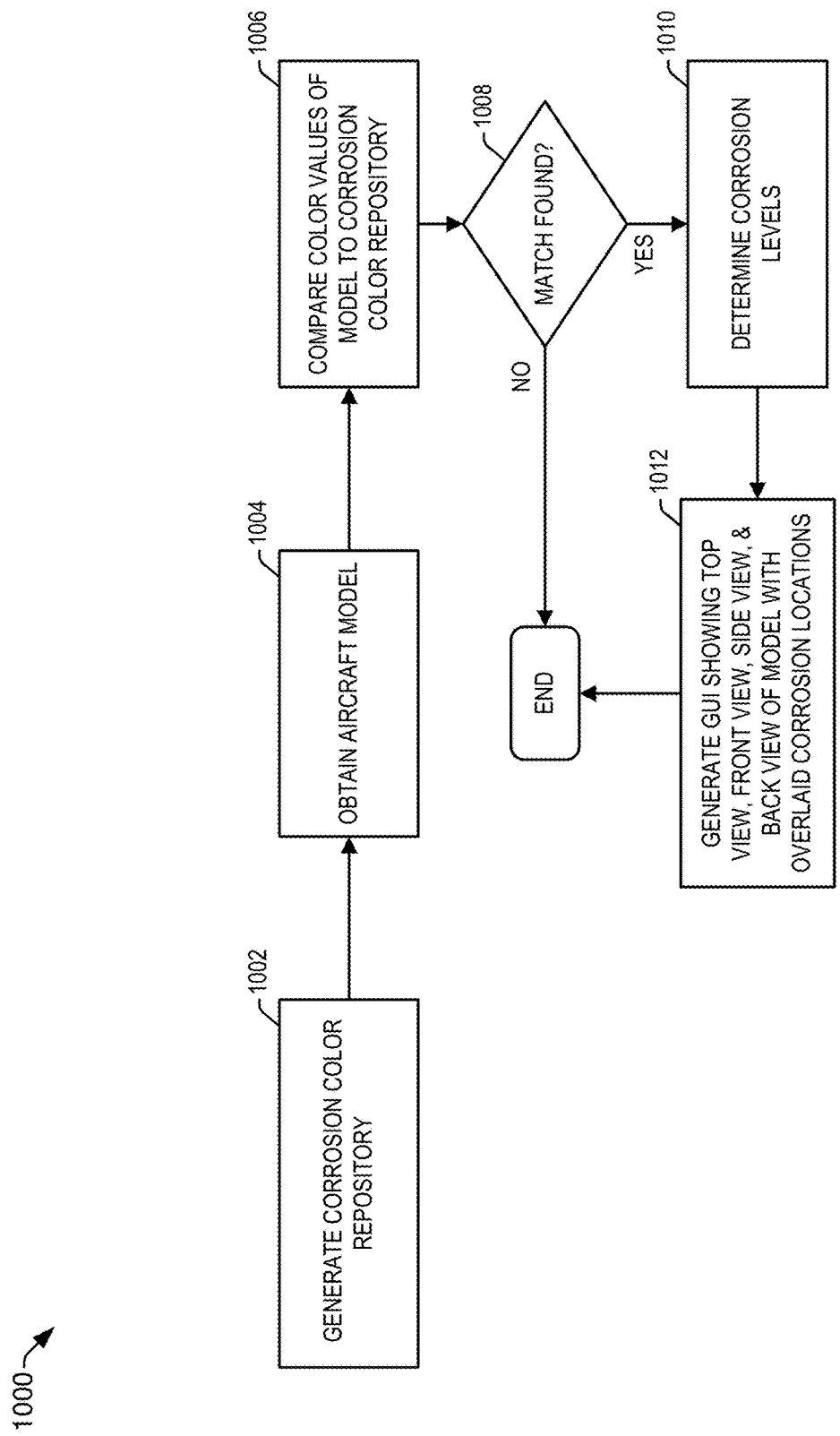
FIG. 10 is a diagram that illustrates a flow chart of an example of a method of using a corrosion color repository to perform aircraft corrosion detection.

Referring to FIG. 10, an example is shown of a method 1000 of using a corrosion color repository to perform aircraft corrosion detection. In a particular aspect, one or more operations of the method 1000 are performed by the corrosion analyzer 110, the device 102, the system 100 of FIG. 1, the corrosion color updater 212, the aircraft corrosion detector 214, the GUI generator 216, the one or more processors 230, the system 200 of FIG. 2, or a combination thereof.

The method 1000 includes, at 1002, generating a corrosion color repository. For example, the corrosion color updater 212 of FIG. 2 generates the corrosion color repository 222, as described with reference to FIGS. 2-3 and 5.

The method 1000 includes, at 1004, obtaining an aircraft model. For example, the GUI generator 216 obtains a three-dimensional (3D) aircraft model (e.g., a mathematical coordinate-based representation) of the aircraft 108. To illustrate, the 3D aircraft model is based on one or more images of the aircraft 108.

The method 1000 also includes, at 1006, comparing color values of the model to the corrosion color repository. In an example, the 3D aircraft model is based on the image 205 of FIG. 2. The aircraft corrosion detector 214 determines image color values 254 descriptive of colors 256 of sets of pixels 244 of the image 205, as described with reference to FIG. 2-3. In a particular implementation, the aircraft corrosion detector 214 determines image color values 254 descriptive of colors 256 associated with a portion of the 3D aircraft model that corresponds to (e.g., represents) the portion 240 of the aircraft 108. The aircraft corrosion detector 214 performs a comparison of the image color values 254 (e.g., the detected color values) and image color values 254 indicated in the corrosion color repository 222.

The method 1000 further includes, at 1008, determining whether a match is found. For example, the aircraft corrosion detector 214 of FIG. 2 determines whether any of the image color values 254 are indicated in the corrosion color repository 222, as described with reference to FIGS. 2-3. The method 1000 ends if none of the image color values 254 (e.g., the detected image color values) are indicated in the corrosion color repository 222.

The method 1000 includes, in response to determining that at least one of the image color values 254 (e.g., the detected image color values) matches an image color value indicated in the corrosion color repository 222, at 1008, determining corrosion levels, at 1010. For example, the aircraft corrosion detector 214 of FIG. 2, determines that the corrosion color repository 222 indicates that an image color value 254A is associated with a corrosion level 264A, that an image color value 254B is associated with a corrosion level 264B, and so on, as described with reference to FIGS. 2-3.

The method 1000 further includes, at 1012, generating a GUI showing a top view, a front view, a side view, and a back view of the 3D aircraft model with overlaid corrosion locations. For example, the GUI generator 216 of FIG. 2 generates a GUI 217 that shows a 3D aircraft model of the aircraft 108, as described with reference to FIG. 7. The 3D aircraft model of the GUI 217 is rotatable to display a top view, a front view, a side view, or a back view with overlaid corrosion locations. For example, a pitch, a yaw, or a roll of the 3D aircraft model can be adjusted in the GUI 217 to bring various surfaces into view. In an example, the GUI generator 216, in response to determining that a first location of the 3D aircraft model corresponds to a location 684A of the aircraft 108, generates the GUI 217 to indicate that a corrosion level 264A is associated with the first location.

Figure 11:
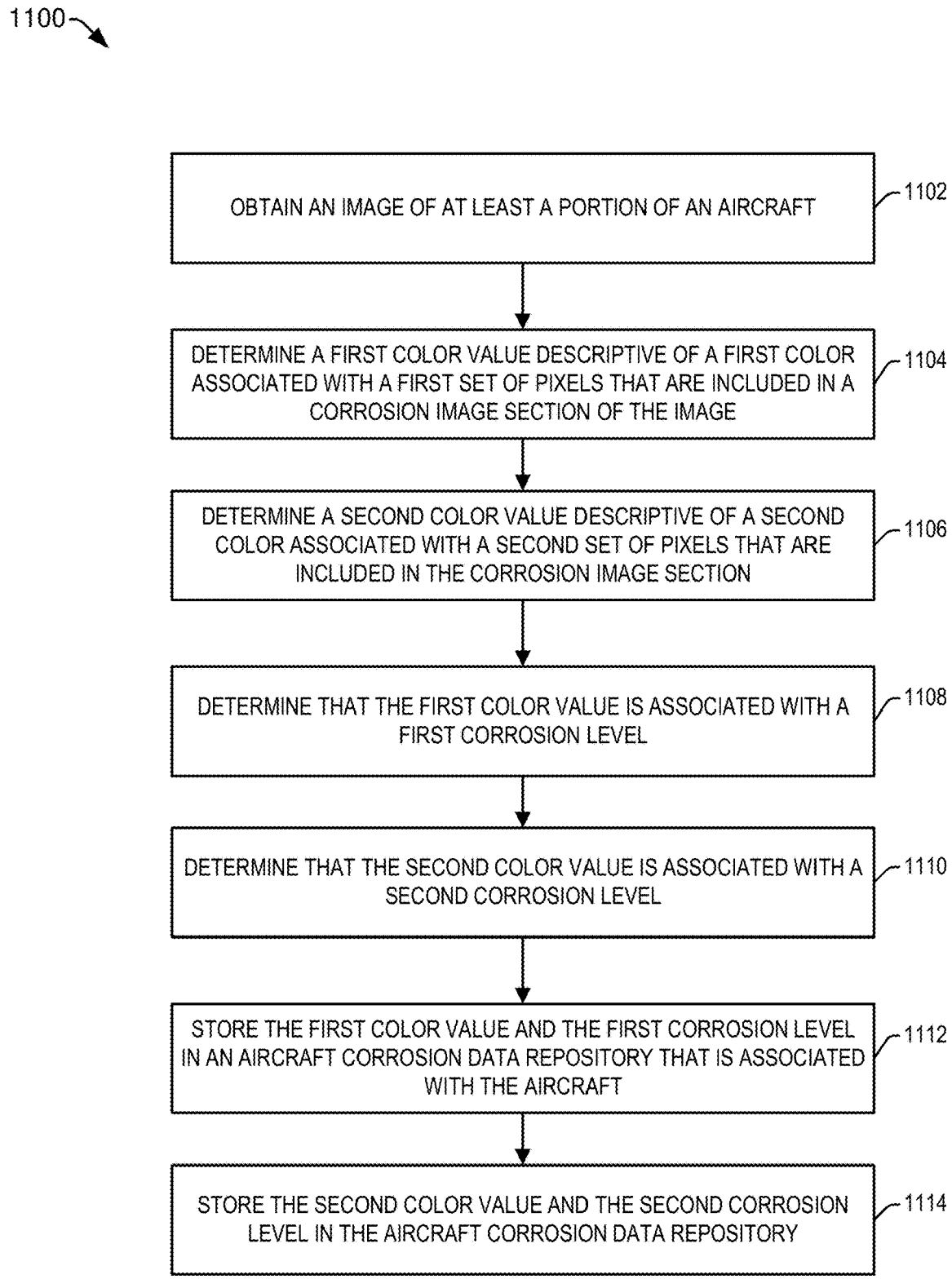
FIG. 11 is a diagram that illustrates a flow chart of an example of a method of aircraft corrosion detection.

Referring to FIG. 11, an example of a method 1100 of aircraft corrosion detection is shown. In a particular aspect, one or more operations of the method 1100 are performed by the drone 118, the corrosion analyzer 110, the device 102, the system 100 of FIG. 1, the one or more cameras 204, the aircraft corrosion detector 214, the one or more processors 230, the system 200 of FIG. 2, or a combination thereof.

The method 1100 includes, at 1102, obtaining an image of at least a portion of an aircraft. For example, the aircraft corrosion detector 214 obtains the image 205 from the one or more cameras 204, as described with reference to FIGS. 2 and 6. The image 205 is of at least the portion 240 of the aircraft 108.

The method 1100 also includes, at 1104, determining a first color value descriptive of a first color associated with a first set of pixels that are included in a corrosion image section of the image. For example, the aircraft corrosion detector 214 determines an image color value 254A of a color 256A associated with a set of pixels 244A that are included in a corrosion image section 242 of the image 205, as described with reference to FIGS. 2 and 6.

The method 1100 further includes, at 1106, determining a second color value descriptive of a second color associated with a second set of pixels that are included in the corrosion image section. For example, the aircraft corrosion detector 214 determines an image color value 254B of a color 256B associated with a set of pixels 244B that are included in the corrosion image section 242, as described with reference to FIGS. 2 and 6.

The method 1100 also includes, at 1108, determining that the first color value is associated with a first corrosion level. For example, the corrosion analyzer 110 determines that the image color value 254A is associated with a corrosion level 264A, as described with reference to FIGS. 2 and 6. In a particular aspect, the corrosion color updater 212, in response to receiving a user input 203 indicating that the color 256A is associated with the corrosion level 364C (e.g., medium corrosion), designates the corrosion level 364C as the corrosion level 264A associated with the image color value 254A. In another aspect, the aircraft corrosion detector 214, in response to determining that the corrosion color repository 222 indicates that the image color value 254A is associated with the corrosion level 264A, determines that the image color value 254A is associated with the corrosion level 264A.

The method 1100 further includes, at 1110, determining that the second color value is associated with a second corrosion level. For example, the corrosion analyzer 110 determines that the image color value 254B is associated with a corrosion level 264B, as described with reference to FIGS. 2 and 6. In a particular aspect, the aircraft corrosion detector 214, in response to receiving a user input 203 indicating that the color 256B is associated with the corrosion level 364A (e.g., low corrosion), designates the corrosion level 364A as the corrosion level 264B associated with the image color value 254B. In another aspect, the aircraft corrosion detector 214, in response to determining that the corrosion color repository 222 indicates that the image color value 254B is associated with the corrosion level 264B, determines that the image color value 254B is associated with the corrosion level 264B.

The method 1100 also includes, at 1112, storing the first color value and the first corrosion level in an aircraft corrosion data repository that is associated with the aircraft. For example, the corrosion analyzer 110 stores the image color value 254A and the corrosion level 264A in the aircraft corrosion data repository 224 that is associated with the aircraft 108, as described with reference to FIGS. 2 and 6. To illustrate, the corrosion analyzer 110 (e.g., the corrosion color updater 212 or the aircraft corrosion detector 214) adds a corrosion repository entry 654A to the aircraft corrosion data repository 224. The corrosion repository entry 654A indicates that the corrosion level 264A is detected at a location 684A of the aircraft 108 at a date 674A, as described with reference to FIG. 6.

The method 1100 further includes, at 1114, storing the second color value and the second corrosion level in the aircraft corrosion data repository. For example, the corrosion analyzer 110 stores the image color value 254B and the corrosion level 264B in the aircraft corrosion data repository 224 that is associated with the aircraft 108, as described with reference to FIGS. 2 and 6. To illustrate, the corrosion analyzer 110 (e.g., the corrosion color updater 212 or the aircraft corrosion detector 214) adds a corrosion repository entry 654A to the aircraft corrosion data repository 224. The corrosion repository entry 654A indicates that the corrosion level 264A is detected at a location 684A of the aircraft 108 at a date 674A, as described with reference to FIG. 6.

Using the corrosion color repository 222, instead of individual technician decisions, can increase accuracy of the corrosion level detection. For example, the corrosion color repository 222 maps the image color value 254A descriptive of the color 256A detected in the image 205 to the corrosion level 264A. Without the corrosion color repository 222, the image color value 254A could be mapped to different corrosion levels by different technicians or by the same technician at different times. Higher accuracy of corrosion level detection enables appropriate resource allocation for any remedial measures and enables reliable tracking of corrosion changes.

Figure 12:
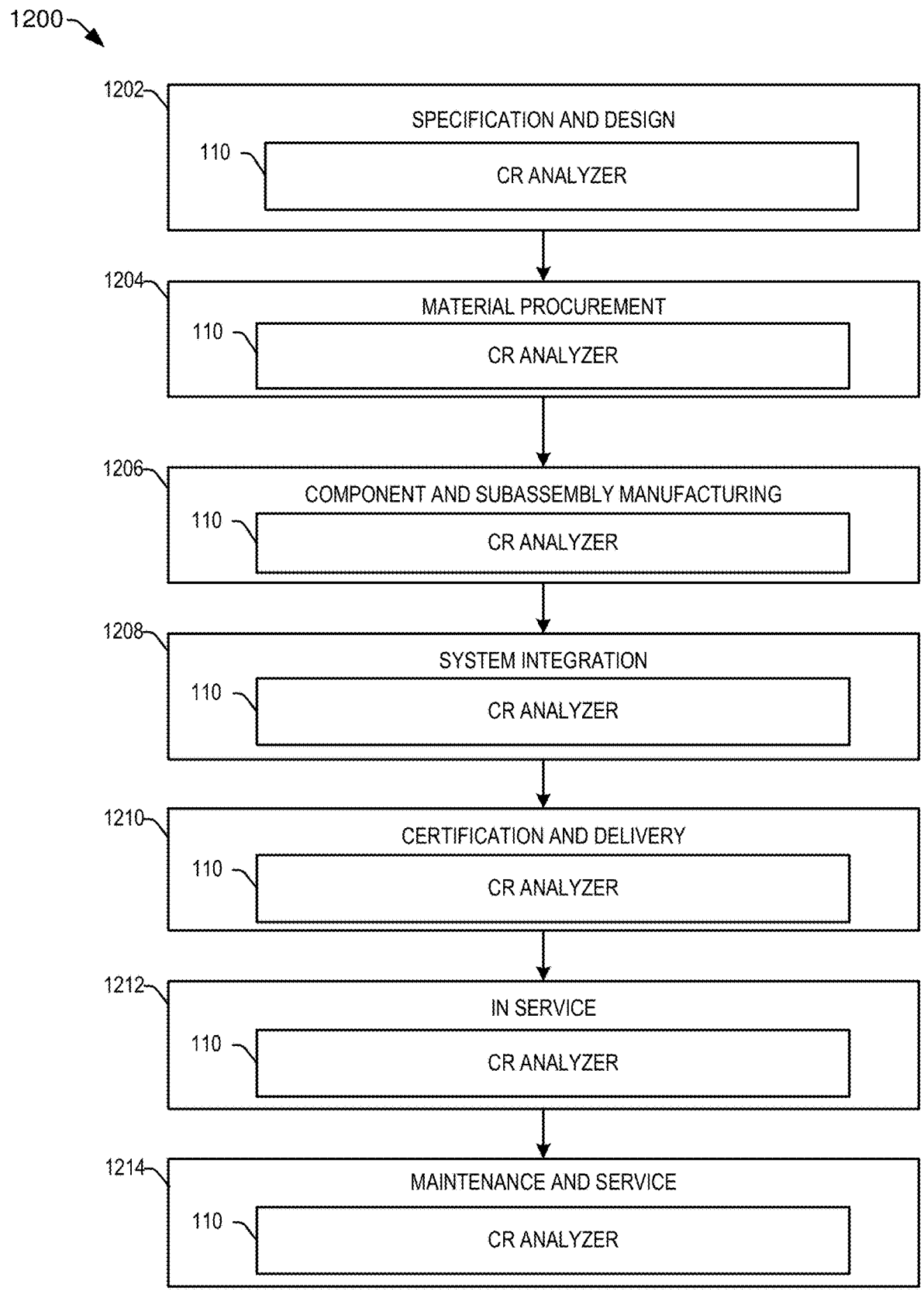
FIG. 12 is a flowchart illustrating a life cycle of an aircraft that is configured to detect aircraft corrosion.

Referring to FIG. 12, a flowchart illustrative of a life cycle of an aircraft that includes a corrosion analyzer is shown and designated 1200. During pre-production, the exemplary method 1200 includes, at 1202, specification and design of an aircraft, such as the aircraft 108 of FIG. 1. During specification and design of the aircraft, the method 1200 may include specification and design of the corrosion analyzer 110. At 1204, the method 1200 includes material procurement, which may include procuring materials for the corrosion analyzer 110.

During production, the method 1200 includes, at 1206, component and subassembly manufacturing and, at 1208, system integration of the aircraft. For example, the method 1200 may include component and subassembly manufacturing of the corrosion analyzer 110 and system integration of the corrosion analyzer 110. At 1210, the method 1200 includes certification and delivery of the aircraft and, at 1212, placing the aircraft in service. Certification and delivery may include certification of the corrosion analyzer 110 to place the corrosion analyzer 110 in service. While in service by a customer, the aircraft may be scheduled for routine maintenance and service (which may also include modification, reconfiguration, refurbishment, and so on). At 1214, the method 1200 includes performing maintenance and service on the aircraft, which may include performing maintenance and service on the corrosion analyzer 110.

Each of the processes of the method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 13:
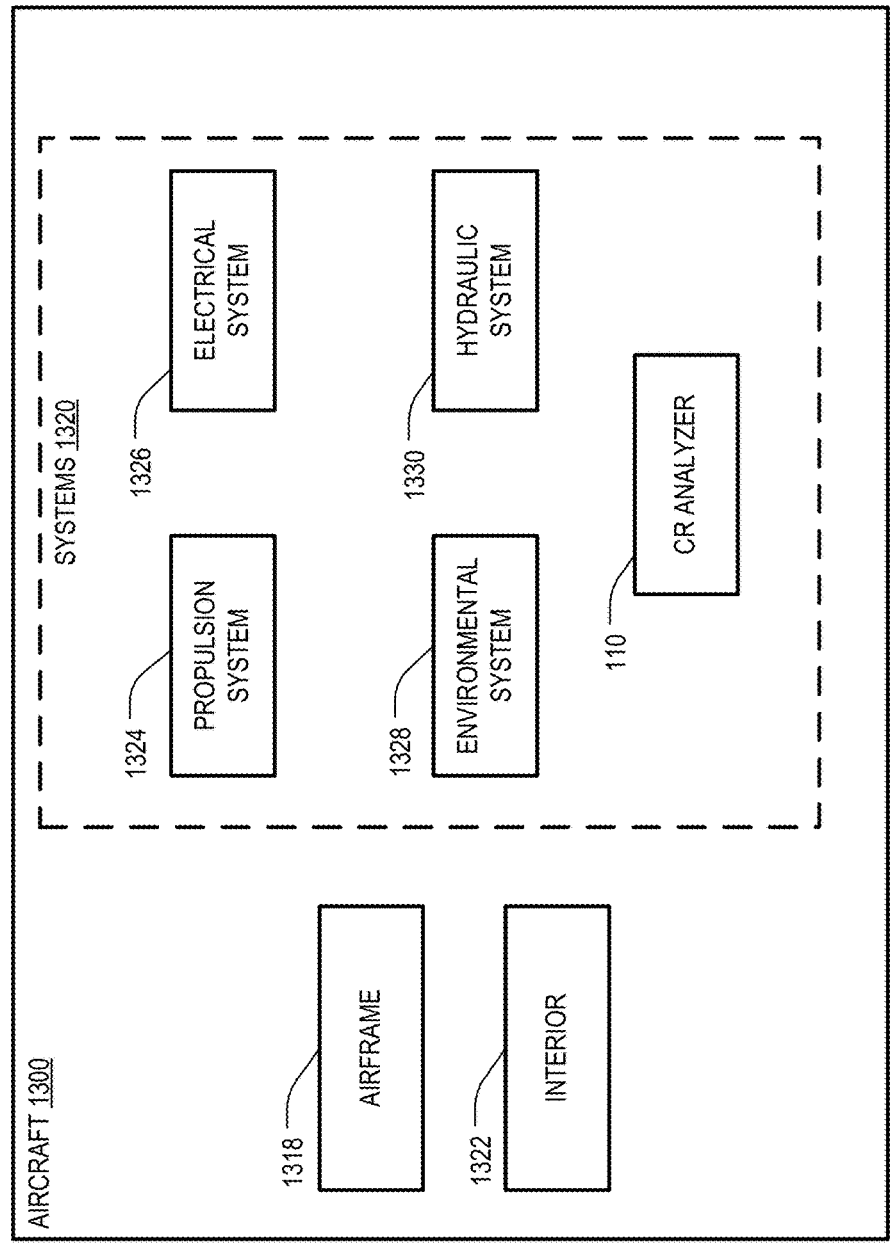
FIG. 13 is a block diagram of an aircraft that is configured to detect aircraft corrosion.

Aspects of the disclosure can be described in the context of an example of a vehicle. A particular example of a vehicle is an aircraft 1300 as shown in FIG. 13. In a particular aspect, the aircraft 1300 corresponds to the aircraft 108 of FIG. 1.

In the example of FIG. 13, the aircraft 1300 includes an airframe 1318 with a plurality of systems 1320 and an interior 1322. Examples of the plurality of systems 1320 include one or more of a propulsion system 1324, an electrical system 1326, an environmental system 1328, a hydraulic system 1330, and the corrosion analyzer 110. Any number of other systems may be included.

Figure 14:
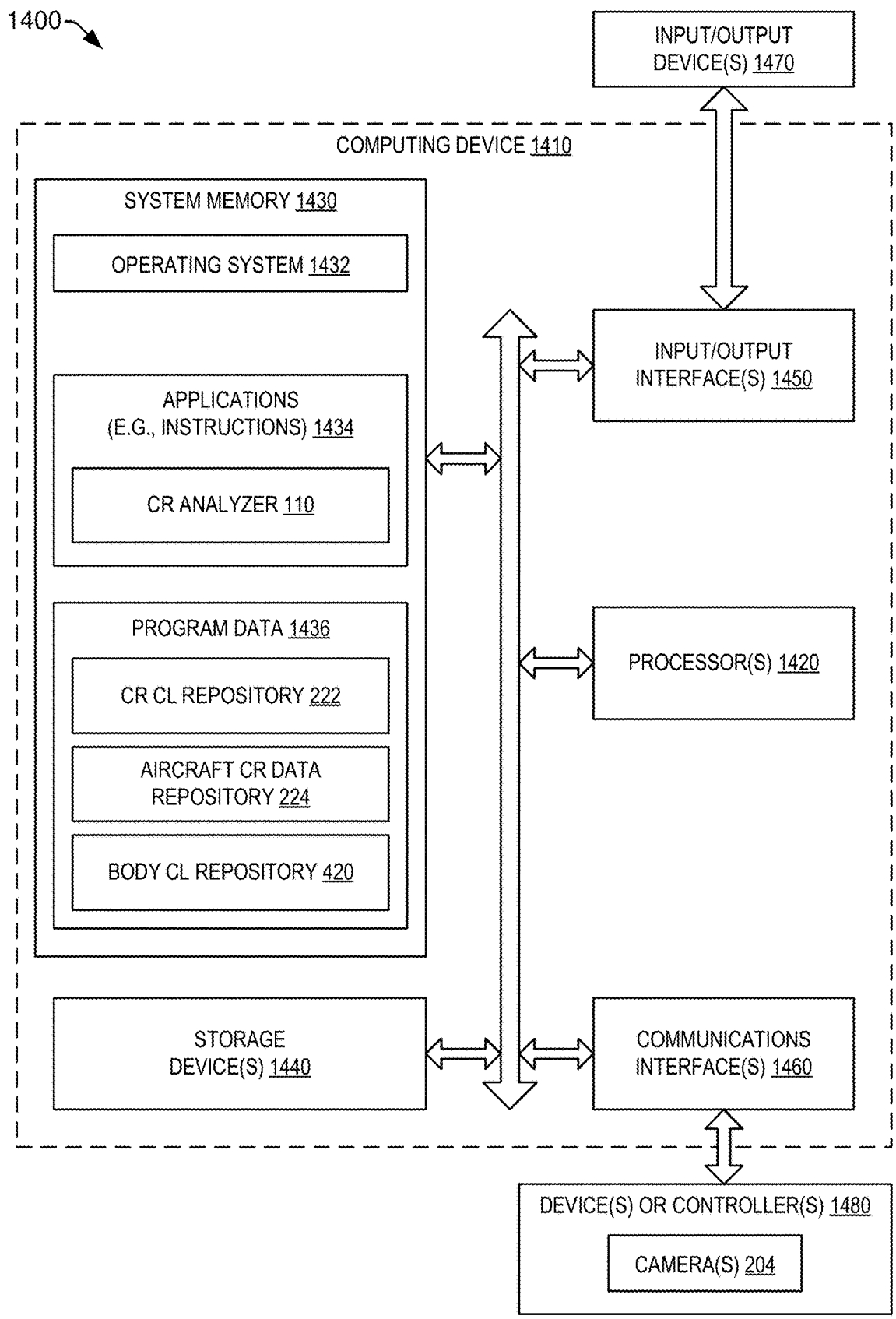
FIG. 14 is a block diagram of a computing environment including a computing device configured to support aspects of computer-implemented methods and computer-executable program instructions (or code) according to the present disclosure.

FIG. 14 is a block diagram of a computing environment 1400 including a computing device 1410 configured to support aspects of computer-implemented methods and computer-executable program instructions (or code) according to the present disclosure. For example, the computing device 1410, or portions thereof, is configured to execute instructions to initiate, perform, or control one or more operations described with reference to FIGS. 1-13.

The computing device 1410 includes one or more processors 1420. In a particular aspect, the processor(s) 1420 correspond to the one or more processors 230 of FIG. 2. The processor(s) 1420 are configured to communicate with system memory 1430, one or more storage devices 1440, one or more input/output interfaces 1450, one or more communications interfaces 1460, or any combination thereof. The system memory 1430 includes volatile memory devices (e.g., random access memory (RAM) devices), nonvolatile memory devices (e.g., read-only memory (ROM) devices, programmable read-only memory, and flash memory), or both. The system memory 1430 stores an operating system 1432, which may include a basic input/output system for booting the computing device 1410 as well as a full operating system to enable the computing device 1410 to interact with users, other programs, and other devices. The system memory 1430 stores system (program) data 1436, such as the image 205, the image color values 254, the corrosion levels 264, the corrosion color repository 222, the aircraft corrosion data repository 224, the GUI 217 of FIG. 2, the corrosion levels 364, the detected characteristics 380 of FIG. 3, the body color repository 420 of FIG. 4, the confirmed corrosion color data 522, the corrosion level colors data 528, the image color value lists 533 of FIG. 5, or a combination thereof. In a particular aspect, the system memory 1430 corresponds to the memory 232 of FIG. 2.

The system memory 1430 includes one or more applications 1434 (e.g., sets of instructions) executable by the processor(s) 1420. As an example, the one or more applications 1434 include instructions executable by the processor(s) 1420 to initiate, control, or perform one or more operations described with reference to FIGS. 1-13. To illustrate, the one or more applications 1434 include instructions executable by the processor(s) 1420 to initiate, control, or perform one or more operations described with reference to the corrosion analyzer 110.

In a particular implementation, the system memory 1430 includes a non-transitory, computer readable medium storing the instructions that, when executed by the processor(s) 1420, cause the processor(s) 1420 to initiate, perform, or control operations to aid in aircraft corrosion detection. The operations include obtaining an image of at least a portion of an aircraft. The operations also include determining a first color value descriptive of a first color associated with a first set of pixels that are included in a corrosion image section of the image. The operations further include determining a second color value descriptive of a second color associated with a second set of pixels that are included in the corrosion image section. The operations also include determining that the first color value is associated with a first corrosion level. The operations further include determining that the second color value is associated with a second corrosion level. The operations also include storing the first corrosion level in an aircraft corrosion data repository that is associated with the aircraft. The operations further include storing the second corrosion level in the aircraft corrosion data repository.

The one or more storage devices 1440 include nonvolatile storage devices, such as magnetic disks, optical disks, or flash memory devices. In a particular example, the storage devices 1440 include both removable and non-removable memory devices. The storage devices 1440 are configured to store an operating system, images of operating systems, applications (e.g., one or more of the applications 1434), and program data (e.g., the program data 1436). In a particular aspect, the system memory 1430, the storage devices 1440, or both, include tangible computer-readable media. In a particular aspect, one or more of the storage devices 1440 are external to the computing device 1410.

The one or more input/output interfaces 1450 enable the computing device 1410 to communicate with one or more input/output devices 1470 to facilitate user interaction. For example, the one or more input/output interfaces 1450 can include a display interface, an input interface, or both. For example, the input/output interface 1450 is adapted to receive input from a user, to receive input from another computing device, or a combination thereof. In some implementations, the input/output interface 1450 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1470 includes one or more user interface devices and displays, including some combination of buttons, keyboards, pointing devices, displays, speakers, microphones, touch screens, and other devices. In a particular aspect, the one or more input/output devices 1470 include the display device 206 of FIG. 2.

The processor(s) 1420 are configured to communicate with devices or controllers 1480 via the one or more communications interfaces 1460. For example, the one or more communications interfaces 1460 can include a network interface. The devices or controllers 1480 can include, for example, the drone 118, the one or more cameras 204, one or more other devices, or any combination thereof.

In conjunction with the described systems and methods, an apparatus for aiding in aircraft corrosion detection is disclosed that includes means for obtaining an image of at least a portion of an aircraft. In some implementations, the means for obtaining an image corresponds to the drone 118, the corrosion analyzer 110, the device 102, the system 100 of FIG. 1, the one or more cameras 204, the corrosion color updater 212, the aircraft corrosion detector 214, the GUI generator 216, the one or more processors 230, the system 200 of FIG. 2, the one or more communications interfaces 1460, the computing device 1410, the processor(s) 1420, one or more other circuits or devices configured to obtain an image, or a combination thereof.

The apparatus also includes means for determining a first color value descriptive of a first color associated with a first set of pixels that are included in a corrosion image section of the image. For example, the means for determining a first color value can correspond to the corrosion analyzer 110, the device 102, the system 100 of FIG. 1, the corrosion color updater 212, the aircraft corrosion detector 214, the one or more processors 230, the system 200 of FIG. 2, the computing device 1410, the processor(s) 1420, one or more other circuits or devices configured to determine a first color value, or a combination thereof.

The apparatus also includes means for determining a second color value descriptive of a second color associated with a second set of pixels that are included in the corrosion image section. For example, the means for determining a second color value can correspond to the corrosion analyzer 110, the device 102, the system 100 of FIG. 1, the corrosion color updater 212, the aircraft corrosion detector 214, the one or more processors 230, the system 200 of FIG. 2, the computing device 1410, the processor(s) 1420, one or more other circuits or devices configured to determine a second color value, or a combination thereof.

The apparatus further includes means for determining that the first color value is associated with a first corrosion level. For example, the means for determining can correspond to the corrosion analyzer 110, the device 102, the system 100 of FIG. 1, the corrosion color updater 212, the aircraft corrosion detector 214, the one or more processors 230, the system 200 of FIG. 2, the computing device 1410, the processor(s) 1420, one or more other circuits or devices configured to determine that the first color value is associated with a first corrosion level, or a combination thereof.

The apparatus also includes means for determining that the second color value is associated with a second corrosion level. For example, the means for determining can correspond to the corrosion analyzer 110, the device 102, the system 100 of FIG. 1, the corrosion color updater 212, the aircraft corrosion detector 214, the one or more processors 230, the system 200 of FIG. 2, the computing device 1410, the processor(s) 1420, one or more other circuits or devices configured to determine that the second color value is associated with a second corrosion level, or a combination thereof.

The apparatus further includes means for storing the first corrosion level in an aircraft corrosion data repository that is associated with the aircraft. For example, the means for storing the first corrosion level can correspond to the corrosion analyzer 110, the device 102, the system 100 of FIG. 1, the corrosion color updater 212, the aircraft corrosion detector 214, the aircraft corrosion data repository 224, the memory 232, the one or more processors 230, the system 200 of FIG. 2, the system memory 1430, the computing device 1410, the processor(s) 1420, one or more other circuits or devices configured to store the first corrosion level, or a combination thereof.

The apparatus also includes means for storing the second corrosion level in the aircraft corrosion data repository. For example, the means for storing the second corrosion level can correspond to the corrosion analyzer 110, the device 102, the system 100 of FIG. 1, the corrosion color updater 212, the aircraft corrosion detector 214, the aircraft corrosion data repository 224, the memory 232, the one or more processors 230, the system 200 of FIG. 2, the system memory 1430, the computing device 1410, the processor(s) 1420, one or more other circuits or devices configured to store the second corrosion level, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-14. In some implementations, part or all of one or more of the operations or methods of FIGS. 1-14 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes: one or more processors configured to: obtain an image of at least a portion of an aircraft; determine a first color value descriptive of a first color associated with a first set of pixels that are included in a corrosion image section of the image; determine a second color value descriptive of a second color associated with a second set of pixels that are included in the corrosion image section; determine that the first color value is associated with a first corrosion level; determine that the second color value is associated with a second corrosion level; store the first corrosion level in an aircraft corrosion data repository that is associated with the aircraft; and store the second corrosion level in the aircraft corrosion data repository.

Example 2 includes the device of Example 1, wherein the one or more processors are configured to, based on determining that the first color value is indicated in a corrosion color repository as associated with the first corrosion level, determine that the first color value is associated with the first corrosion level.

Example 3 includes the device of Example 2, wherein the corrosion color repository is associated with the aircraft, the portion of the aircraft, or both.

Example 4 includes the device of any of Example 1 to Example 3, wherein the one or more processors are configured to: determine a location on the aircraft corresponding to the first set of pixels; and generate a graphical user interface (GUI) indicating, on a model of the aircraft, that the location is associated with the first corrosion level.

Example 5 includes the device of Example 4, wherein the one or more processors are configured to, based on determining that the aircraft corrosion data repository indicates a previously detected corrosion level of the location on the aircraft: determine a change in corrosion level based on a comparison of the first corrosion level and the previously detected corrosion level; and indicate, via the GUI, the change in corrosion level of the location.

Example 6 includes the device of Example 5, wherein the previously detected corrosion level is stored in the aircraft corrosion data repository based on user input.

Example 7 includes the device of Example 5, wherein the previously detected corrosion level is stored in the aircraft corrosion data repository based on a previously obtained image of the aircraft.

Example 8 includes the device of any of Example 1 to Example 7, wherein the first corrosion level is stored in the aircraft corrosion data repository with a timestamp.

Example 9 includes the device of any of Example 1 to Example 8, wherein the one or more processors are configured to, based on determining that the first corrosion level exceeds a corrosion level remedial threshold: schedule maintenance of the aircraft, generate an alert, or both.

Example 10 includes the device of any of Example 1 to Example 9, wherein the one or more processors are configured to receive a user input designating a section of the image as the corrosion image section.

Example 11 includes the device of any of Example 1 to Example 10, wherein the one or more processors are configured to receive a user input selecting the first set of pixels from the corrosion image section.

Example 12 includes the device of any of Example 1 to Example 11, wherein the one or more processors are configured to, based on receiving a user selection of an aircraft body color, refrain from adding a color value descriptive of the aircraft body color to the aircraft corrosion data repository, a corrosion color repository, or both.

Example 13 includes the device of any of Example 1 to Example 12, wherein the one or more processors are configured to, based on determining that the first color value is not included in a corrosion color repository, store the first color value and the first corrosion level in the corrosion color repository.

Example 14 includes the device of Example 13, wherein the one or more processors are configured to determine that the first corrosion level is associated with the first color value based on a user input.

Example 15 includes the device of any of Example 1 to Example 14, wherein the one or more processors are configured to obtain the image from one or more cameras.

Example 16 includes the device of Example 15, wherein the one or more processors are configured to steer the one or more cameras towards the portion of the aircraft to obtain the image.

Example 17 includes the device of any of Example 1 to Example 16, wherein the portion of the aircraft is user specified.

According to Example 18, a method includes: obtaining, at a device, an image of at least a portion of an aircraft; determining, at the device, a first color value descriptive of a first color associated with a first set of pixels that are included in a corrosion image section of the image; determining, at the device, a second color value descriptive of a second color associated with a second set of pixels that are included in the corrosion image section; determining, at the device, that the first color value is associated with a first corrosion level; determining, at the device, that the second color value is associated with a second corrosion level; storing the first corrosion level in an aircraft corrosion data repository that is associated with the aircraft; and storing the second corrosion level in the aircraft corrosion data repository.

Example 19 includes the method of Example 18, further including, based on determining that the first color value is indicated in the corrosion color repository as associated with the first corrosion level, determining that the first color value is associated with the first corrosion level.

Example 20 includes the method of Example 19, wherein the corrosion color repository is associated with the aircraft, the portion of the aircraft, or both.

Example 21 includes the method of any of Example 18 to Example 20, further comprising: determining a location on the aircraft corresponding to the first set of pixels; and generating a graphical user interface (GUI) indicating, on a model of the aircraft, that the location is associated with the first corrosion level.

Example 22 includes the method of Example 21, further comprising, based on determining that the aircraft corrosion data repository indicates a previously detected corrosion level of the location on the aircraft: determining a change in corrosion level based on a comparison of the first corrosion level and the previously detected corrosion level; and indicating, via the GUI, the change in corrosion level of the location.

Example 23 includes the method of Example 22, wherein the previously detected corrosion level is stored in the aircraft corrosion data repository based on user input.

Example 24 includes the method of Example 22, wherein the previously detected corrosion level is stored in the aircraft corrosion data repository based on a previously obtained image of the aircraft.

Example 25 includes the method of any of Example 18 to Example 24, wherein the first corrosion level is stored in the aircraft corrosion data repository with a timestamp.

Example 26 includes the method of any of Example 18 to Example 25, further comprising, based on determining that the first corrosion level exceeds a corrosion level remedial threshold: scheduling maintenance of the aircraft, generating an alert, or both.

Example 27 includes the method of any of Example 18 to Example 26, further comprising receiving a user input designating a section of the image as the corrosion image section.

Example 28 includes the method of any of Example 18 to Example 27, further comprising receiving a user input selecting the first set of pixels from the corrosion image section.

Example 29 includes the method of any of Example 18 to Example 28, further comprising, based on receiving a user selection of an aircraft body color, refraining from adding a color value descriptive of the aircraft body color to the aircraft corrosion data repository, a corrosion color repository, or both.

Example 30 includes the method of any of Example 18 to Example 29, further comprising, based on determining that the first color value is not included in a corrosion color repository, storing the first color value and the first corrosion level in the corrosion color repository.

Example 31 includes the method of Example 30, further comprising determining that the first corrosion level is associated with the first color value based on a user input.

Example 32 includes the method of any of Example 18 to Example 31, further comprising obtaining the image from one or more cameras.

Example 33 includes the method of Example 32, further comprising steering the one or more cameras towards the portion of the aircraft to obtain the image.

Example 34 includes the method of any of Example 18 to Example 33, wherein the portion of the aircraft is user specified.

According to Example 35, a device includes: a memory configured to store instructions; and a processor configured to execute the instructions to perform the method of any of Example 18 to Example 34.

According to Example 36, a non-transitory computer-readable medium stores instructions that, when executed by a processor, cause the processor to perform the method of any of Example 18 to Example 34.

According to Example 37, an apparatus includes means for carrying out the method of any of Example 18 to Example 34.

Example 38 includes a non-transitory computer-readable medium storing instructions that, when executed by one or more processors, cause the one or more processors to: obtain an image of at least a portion of an aircraft; determine a first color value descriptive of a first color associated with a first set of pixels that are included in a corrosion image section of the image; determine a second color value descriptive of a second color associated with a second set of pixels that are included in the corrosion image section; determine that the first color value is associated with a first corrosion level; determine that the second color value is associated with a second corrosion level; store the first corrosion level in an aircraft corrosion data repository that is associated with the aircraft; and store the second corrosion level in the aircraft corrosion data repository.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
one or more processors configured to:
obtain an image of at least a portion of an aircraft;
determine a first color value descriptive of a first color associated with a first set of pixels that are included in a corrosion image section of the image;
determine a location on the aircraft corresponding to the first set of pixels;
determine a second color value descriptive of a second color associated with a second set of pixels that are included in the corrosion image section;
determine that the first color value is associated with a first corrosion level;
determine that the second color value is associated with a second corrosion level;
based on determining that an aircraft corrosion data repository that is associated with the aircraft indicates a previously detected corrosion level of the location on the aircraft, determine a change in corrosion level based on a comparison of the first corrosion level and the previously detected corrosion level;
generate a graphical user interface (GUI) indicating, on a model of the aircraft, that the location is associated with the first corrosion level;
store the first corrosion level in the aircraft corrosion data repository; and
store the second corrosion level in the aircraft corrosion data repository.

2. The device of claim 1, wherein the one or more processors are configured to, based on determining that the first color value is indicated in a corrosion color repository as associated with the first corrosion level, determine that the first color value is associated with the first corrosion level.

3. The device of claim 2, wherein the corrosion color repository is associated with the aircraft, the portion of the aircraft, or both.

4. The device of claim 1, wherein the one or more processors are configured to, based on determining that the aircraft corrosion data repository indicates a previously detected corrosion level of the location on the aircraft indicate, via the GUI, the change in corrosion level of the location.

5. The device of claim 4, wherein the previously detected corrosion level is stored in the aircraft corrosion data repository based on user input.

6. The device of claim 4, wherein the previously detected corrosion level is stored in the aircraft corrosion data repository based on a previously obtained image of the aircraft.

7. The device of claim 1, wherein the first corrosion level is stored in the aircraft corrosion data repository with a timestamp.

8. The device of claim 1, wherein the one or more processors are configured to, based on determining that the first corrosion level exceeds a corrosion level remedial threshold: schedule maintenance of the aircraft, generate an alert, or both.

9. The device of claim 1, wherein the one or more processors are configured to receive a user input designating a section of the image as the corrosion image section.

10. The device of claim 1, wherein the one or more processors are configured to receive a user input selecting the first set of pixels from the corrosion image section.

11. The device of claim 1, wherein the one or more processors are configured to, based on receiving a user selection of an aircraft body color, refrain from adding a color value descriptive of the aircraft body color to the aircraft corrosion data repository, a corrosion color repository, or both.

12. The device of claim 1, wherein the one or more processors are configured to, based on determining that the first color value is not included in a corrosion color repository, store the first color value and the first corrosion level in the corrosion color repository.

13. The device of claim 12, wherein the one or more processors are configured to determine that the first corrosion level is associated with the first color value based on a user input.

14. The device of claim 1, wherein the one or more processors are configured to obtain the image from one or more cameras.

15. The device of claim 14, wherein the one or more processors are configured to steer the one or more cameras towards the portion of the aircraft to obtain the image.

16. The device of claim 1, wherein the portion of the aircraft is user specified.

17. A method comprising:
obtaining, at a device, an image of at least a portion of an aircraft;
determining, at the device, a first color value descriptive of a first color associated with a first set of pixels that are included in a corrosion image section of the image;
determine a location on the aircraft corresponding to the first set of pixels;
determining, at the device, a second color value descriptive of a second color associated with a second set of pixels that are included in the corrosion image section;
determining, at the device, that the first color value is associated with a first corrosion level;
determining, at the device, that the second color value is associated with a second corrosion level;
based on determining that an aircraft corrosion data repository that is associated with the aircraft indicates a previously detected corrosion level of the location on the aircraft, determining a change in corrosion level based on a comparison of the first corrosion level and the previously detected corrosion level;
generating a graphical user interface (GUI) indicating, on a model of the aircraft, that the location is associated with the first corrosion level;
storing the first corrosion level in the aircraft corrosion data repository; and
storing the second corrosion level in the aircraft corrosion data repository.

18. The method of claim 17, further comprising, based on determining that the first color value is indicated in a corrosion color repository as associated with the first corrosion level, determining that the first color value is associated with the first corrosion level.

19. A non-transitory computer-readable medium storing instructions that, when executed by one or more processors, cause the one or more processors to:
   obtain an image of at least a portion of an aircraft;
   determine a first color value descriptive of a first color associated with a first set of pixels that are included in a corrosion image section of the image;
   determine a location on the aircraft corresponding to the first set of pixels;
   determine a second color value descriptive of a second color associated with a second set of pixels that are included in the corrosion image section;
   determine that the first color value is associated with a first corrosion level;
   determine that the second color value is associated with a second corrosion level;
   based on determining that an aircraft corrosion data repository that is associated with the aircraft indicates a previously detected corrosion level of the location on the aircraft, determine a change in corrosion level based on a comparison of the first corrosion level and the previously detected corrosion level;
   generate a graphical user interface (GUI) indicating, on a model of the aircraft, that the location is associated with the first corrosion level;
   store the first corrosion level in the aircraft corrosion data repository; and
   store the second corrosion level in the aircraft corrosion data repository.

20. The non-transitory computer-readable medium of claim 19, wherein the instructions further cause the one or more processors to, based on determining that the first color value is indicated in a corrosion color repository as associated with the first corrosion level, determine that the first color value is associated with the first corrosion level.

* * * * *